United States Patent
Kaneda et al.

(10) Patent No.: US 6,601,670 B2
(45) Date of Patent: Aug. 5, 2003

(54) APPARATUS FOR CHANGING COMBINATIONS OF CONTROL DEVICES AND ACTUATORS

(75) Inventors: Tomohisa Kaneda, Tochigi (JP); Shuuji Hori, Oyama (JP)

(73) Assignee: Komatsu Ltd., Tokyo (JP)

( * ) Notice: Subject to any disclaimer, the term of this patent is extended or adjusted under 35 U.S.C. 154(b) by 97 days.

(21) Appl. No.: 09/981,823

(22) Filed: Oct. 19, 2001

(65) Prior Publication Data

US 2002/0046895 A1 Apr. 25, 2002

(30) Foreign Application Priority Data

Oct. 25, 2000 (JP) ........................................ 2000-325620

(51) Int. Cl.$^7$ .............................................. B60K 26/00
(52) U.S. Cl. ...................... 180/333; 180/324; 180/334; 180/6.3
(58) Field of Search ................................. 180/315, 321, 180/324, 333, 334, 6.3

(56) References Cited

U.S. PATENT DOCUMENTS

| | | | | |
|---|---|---|---|---|
| 4,541,497 A | * | 9/1985 | Riediger et al. | 180/6.48 |
| 4,664,220 A | * | 5/1987 | Ruhter et al. | 180/315 |
| 4,699,239 A | * | 10/1987 | Ishino et al. | 180/315 |
| 4,794,813 A | * | 1/1989 | Brown et al. | 74/491 |
| 4,949,805 A | * | 8/1990 | Mather et al. | 180/333 |
| 5,285,861 A | * | 2/1994 | Nakamura | 180/6.44 |
| 5,868,230 A | * | 2/1999 | Chatterjea et al. | 192/13 R |
| 5,887,669 A | * | 3/1999 | Ostler et al. | 180/53.4 |
| 5,937,897 A | * | 8/1999 | Chatterjea et al. | 137/554 |
| 6,328,127 B1 | * | 12/2001 | Hori et al. | 180/333 |
| 6,435,289 B1 | * | 8/2002 | Hori et al. | 180/6.3 |
| 6,523,636 B2 | * | 2/2003 | Chatterjea | 180/333 |

* cited by examiner

Primary Examiner—Paul N. Dickson
Assistant Examiner—Deanna Draper
(74) Attorney, Agent, or Firm—Varndell & Varndell, PLLC

(57) ABSTRACT

Controllability of a vehicle such as a skid steer loader is improved and the burden on an operator is reduced. When operation is conducted according to the first operation pattern, the pattern switching lever of the first switching valve is switched to the first operation pattern side and the pattern switching lever of the second switching valve is switched to the first operation pattern side. Furthermore, when operation is conducted according to the second operation pattern, the pattern switching lever of the first switching valve is switched to the second operation pattern side and the pattern switching lever of the second switching valve is switched to the second operation pattern side. Moreover, when operation is conducted according to the third operation pattern, the pattern switching lever of the first switching valve is switched to the third operation pattern side and the pattern switching lever of the second switching valve is switched to the third operation pattern side.

2 Claims, 20 Drawing Sheets

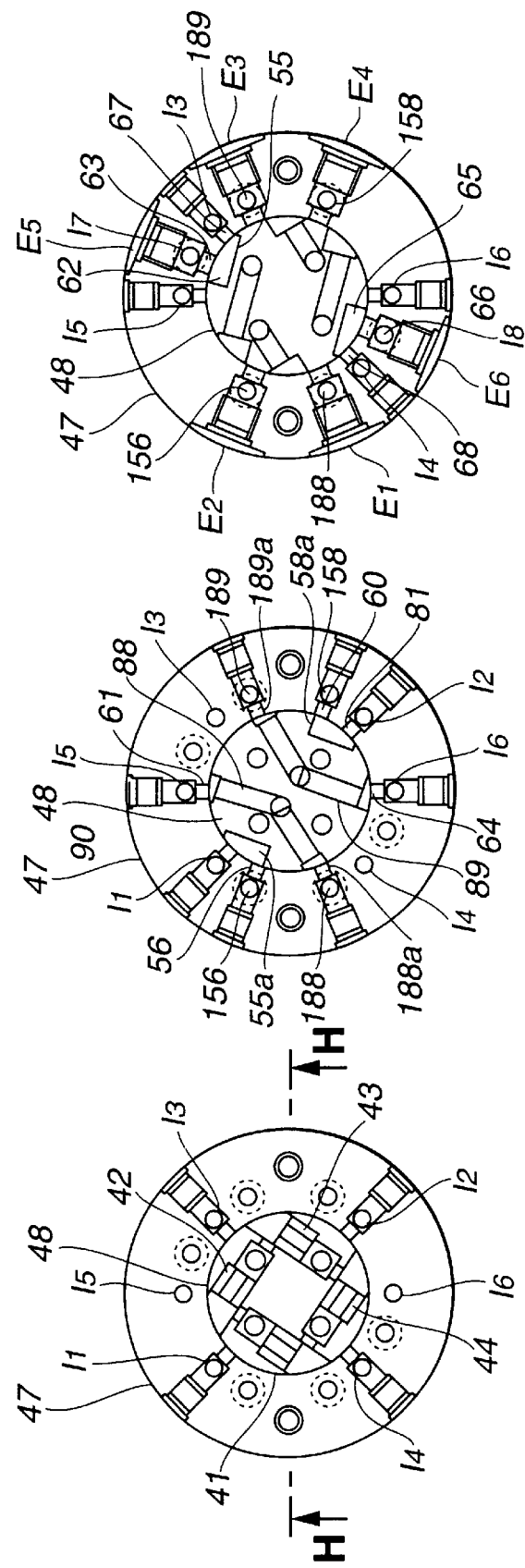

APPARATUS FOR CHANGING COMBINATIONS OF CONTROL DEVICES AND ACTUATORS

BACKGROUND OF THE INVENTION

1. Field of the Invention

The present invention relates to a combination changing apparatus for changing combinations of relationships between manipulation directions of control levers, pedals and the like and drive directions of actuators.

2. Description of the Related Art

In a hydraulic shovel, the four working machines such as an upper rotary body, a boom, an arm, and a bucket are typically actuated by manipulating the left and right control levers provided at the left and right side of an operator's seat.

Conventionally, combinations of relationships (referred to as operation patterns hereinbelow) between manipulation directions of the two, left and right, control levers and actuation directions of the four working machines differed depending on manufacturers of hydraulic shovel.

Therefore, when an operator who got used to operating a hydraulic shovel manufactured by company A operated a hydraulic shovel manufactured by other companies B or C, his fatigue was increased because he had no experience in operating such shovels. Furthermore, a large burden was placed on the operator because he had to operate while being aware of the difference between the operation patterns.

Accordingly, inventions and devices relating to operation pattern switching for switching the operation patterns in hydraulic shovels have been created.

In Japanese Utility Model Gazette No. 6-38935, a device (an idea) was disclosed of switching operation patterns of a hydraulic shovel by switching the path of hydraulic fluid.

By contrast, in skid steer loaders, the working machine is comprised of a boom and a bucket. The left and right traveling bodies (wheels or crawlers) are actuated by actuators for the two, left and right, traveling bodies, which are provided at the left and right side of the vehicle. The left and right traveling bodies are independently driven by hydraulic motors respectively provided at the left and right side of the vehicle. The left traveling body of the vehicle is independently driven by a drive mechanism specially provided at the left side of the vehicle body and a speed thereof is changed independently. Similarly, the right traveling body of the vehicle is independently driven by a drive mechanism specially provided at the right side of the vehicle body and a speed thereof is changed independently. The drive mechanisms are composed of respective hydraulic pumps and hydraulic motors.

In a skid steer loader, four traveling bodies and working machines, namely, a boom, a bucket and two, left and right, traveling bodies are actuated by manipulation of left and right control levers provided to the left and right of the operator's seat.

The combinations of relationships (operation patterns) between manipulation directions of the two, left and right, control levers and actuation directions of the four traveling bodies and working machines differ depending on the manufacturer of skid steer loader. Various operation patterns are shown in FIGS. 18(a) to 18(d).

As shown in FIGS. 18(a) to 18(d), a left control lever 6L and a right control lever 6R are provided to the left and right of the operator's seat 80.

In the operation pattern shown in FIG. 18(a), the manipulation directions of the left control lever 6L correspond to the actuation directions (left-forward, left-rearward) of the left traveling body and actuation directions (boom up, boom down) of the boom, and the manipulation directions of the right control lever correspond to the actuation directions (right-forward, right-rearward) of the right traveling body and actuation directions (bucket dumping, bucket excavation) of the bucket. Thus, the left and right traveling bodies are actuated by manipulation of the left and right control levers 6L, 6R.

In the operation pattern shown in FIGS. 18(b) and 18(c), the manipulation directions of the left control lever 6L correspond to the actuation directions (forward, rearward, right turn, left turn) of the left and right traveling bodies, and the manipulation directions of the right control lever correspond to the actuation directions (boom up, boom down, bucket dumping, bucket excavation) of the boom and bucket. Thus, the left and right traveling bodies can be actuated by manipulation of only the left control lever 6L.

In the operation pattern shown in FIG. 18(b), the left and right traveling bodies are turned by rotation manipulation of the left control lever 6L and the bucket is actuated by rotation manipulation of the right control lever 6R.

FIG. 19 illustrates a hydraulic circuit diagram relating to a case (FIGS. 18(b) and 18(c)) in which the left and right traveling bodies are actuated only by manipulation of the left control lever 6L.

As shown in FIG. 19, the left control lever device 5L is composed of the left control lever 6L, a bridge circuit 45 in which four shuttle valves 41, 42, 43, 44 are connected in a ring-like fashion, and hydraulic passages 11, 12, 13, 14 linking the left control lever 6L and bridge circuit 45. Passages 11, 12, 13, 14 are passages in which hydraulic signals (pilot pressure) are generated according to manipulation of the left control lever 6L in the frontward, rearward, rightward, or leftward direction, respectively.

Passages 11, 12, 13, 14 are linked to inlet openings of shuttle valves 41, 42, inlet openings of shuttle valves 43, 44, inlet openings of shuttle valves 42, 43, and inlet openings of shuttle valves 44, 41, respectively.

The outlet openings of shuttle valves 41, 42, 43, 44 are linked to a forward movement side port 32F of right traveling body control valve 32, forward movement side port 31F of left traveling body control valve 31, rearward movement side port 32R of right traveling body control valve 32, and rearward movement side port 31R of left traveling body control valve 31, respectively. The capacity of a hydraulic pump 33 for the left traveling body is changed by the left traveling body control valve 31 and the capacity of a hydraulic pump 34 for the right traveling body is changed by the right traveling body control valve 32.

The hydraulic pump 33 for the left traveling body actuates the left traveling body via a hydraulic motor. If a hydraulic signal (pilot pressure) acts upon the forward movement side port 31F of left traveling body control valve 31, the capacity of the hydraulic pump 33 for the left traveling body changes to the forward side and the left traveling body is actuated in the forward direction. Furthermore, if a hydraulic signal acts upon the rearward movement side port 31R of left traveling body control valve 31, the capacity of the hydraulic pump 33 for the left traveling body changes to the rearward side and the left traveling body is actuated in the rearward direction.

Likewise, if a hydraulic signal acts upon the forward movement side port 32F of right traveling body control valve 32, the capacity of the hydraulic pump 34 for the right traveling body changes to the forward side and the right traveling body is actuated in the forward direction.

Furthermore, if a hydraulic signal acts upon the rearward movement side port 32R of right traveling body control valve 32, the capacity of the hydraulic pump 34 for the right traveling body changes to the rearward side and the right traveling body is actuated in the rearward direction.

Thus, if the left control lever 6L is manipulated in the forward direction, the vehicle "moves forward", if it is manipulated in the rearward direction, the vehicle "moves rearward", if it is manipulated in the rightward direction, the vehicle "turns right", and if it is manipulated in the leftward direction, the vehicle "turns left".

On the other hand, the right control lever device 5R is composed of the right control lever 6R and hydraulic passages 15, 16, 17, 18 linked to the right control lever 6R. Passages 15, 16, 17, 18 are passages in which hydraulic signals are generated according to manipulation of the right control lever 6R in the forward, rearward, rightward, and leftward direction, respectively. Passages 15, 16, 17, 18 are linked to a boom-down side port 72a of boom control valve 72, boom-up side port 72b of boom control valve 72, a bucket-dumping side port 73a of bucket control valve 73, and bucket-excavation side port 73b of bucket control valve 73. The hydraulic fluid is supplied to the boom control valve 72 and bucket control valve 73 from a pump 71 for working machines. The hydraulic fluid controlled by the boom control valve 72 and bucket control valve 73 is supplied to the boom hydraulic cylinder and bucket hydraulic cylinder, respectively.

If a hydraulic signal (pilot pressure) acts upon the boom-down side port 72a of boom control valve 72, the boom hydraulic cylinder is driven downward and the boom is actuated downward.

If the hydraulic signal acts upon the boom-up side port 72b of boom control valve 72, the boom hydraulic cylinder is driven upward and the boom is actuated upward. Likewise, if the hydraulic signal acts upon the bucket-dumping side port 73a of bucket control valve 73, the bucket hydraulic cylinder is driven to the bucket-dumping side and the bucket is actuated to the dumping side. Furthermore, if the hydraulic signal acts upon the bucket-excavation side port 73b of bucket control valve 73, the bucket hydraulic cylinder is driven to the bucket-excavation side and the bucket is actuated to the excavation side.

Thus, if the right control lever 6R is manipulated in the forward direction, the boom is actuated downward, if it is manipulated in the rearward direction, the boom is actuated upward, if it is manipulated in the rightward direction, the bucket is actuated to the dumping side, and if it is manipulated in the leftward direction, the bucket is actuated to the excavation side.

FIG. 20 illustrates a hydraulic circuit diagram relating to a case (FIG. 18(a)) in which the left and right traveling bodies are actuated by manipulation of left and right control levers 6L, 6R.

The explanation of structural elements common with FIG. 19 is omitted.

The left control lever 6L is connected to the hydraulic pump 33 for the left traveling body and boom control valve 72 by passages 91 and 92, respectively. The passage 91 is a passage in which a hydraulic signal is generated according to manipulation of left control lever 6L in the forward and rearward direction. The passage 92 is a passage in which a hydraulic signal is generated according to manipulation of left control lever 6L in the leftward and rightward direction.

The right control lever 6R is connected to the hydraulic pump 34 for the right traveling body and bucket control valve 73 by passages 93 and 94, respectively. The passage 93 is a passage in which a hydraulic signal is generated according to manipulation of right control lever 6R in the forward and rearward direction. The passage 94 is a passage in which a hydraulic signal is generated according to manipulation of right control lever 6R in the leftward and rightward direction.

Thus, if the left control lever 6L is manipulated in the forward direction, the vehicle "advances forward and to the left", and if it is manipulated in the rearward direction, the vehicle "moves rearward and to the left". Furthermore, if it is manipulated in the rightward direction, the boom is actuated downward, and if it is manipulated in the leftward direction, the boom is actuated upward. If the right control lever 6R is manipulated in the forward direction, the vehicle "advances forward and to the right", and if it is manipulated in the rearward direction, the vehicle "moves rearward and to the right". Furthermore, if it is manipulated in the rightward direction, the bucket is actuated to the dumping side, and if it is manipulated in the leftward direction, the bucket is actuated to the excavation side.

As described above, the vehicle such as a skid steer loader has an operation pattern (will be referred to as the first operation pattern) in which the left and right traveling bodies are actuated by manipulation of only one control lever (left control lever 6L) and an operation pattern (will be referred to as the second operation pattern) in which the left and right traveling bodies are actuated by manipulation of both the left and right control levers 6L, 6R.

Furthermore, by contrast with hydraulic shovels and the like, the vehicles such as skid steer loaders have a high frequency of complex actuation of traveling bodies and a low frequency of actuation of working machines. Therefore, an operation pattern (will be referred to as the third operation pattern) is also present in which the working machines are actuated by foot manipulation of a pedal, while the left and right traveling bodies are being actuated by manipulation of control levers.

As shown in the above-described Japanese Utility Model Gazette No. 6-38935, though there is the conventional technology for switching the operation patterns when a working machine is actuated, there is no conventional technology relating to switching between the first operation pattern, second operation pattern, and third operation pattern in case a traveling body is actuated.

It is an object of the present invention to provide for switching between the first operation pattern, second operation pattern, and third operation pattern, improve controllability of a vehicle such as a skid steer loader, and reduce the burden on the operator.

SUMMARY OF THE INVENTION

In accordance with the first aspect of the present invention, in order to attain the above-described object, an apparatus for changing a combination of control devices and actuators is provided, this apparatus comprising:

two, left and right, first control devices (5L, 5R) for outputting a plurality of first manipulation direction signals according to a plurality of manipulation directions, two, left and right, second control devices (15L, 15R) for outputting a plurality of second manipulation direction signals according to a plurality of manipulation directions, actuators (33, 34) for left and right traveling bodies, which are provided for each of the left and right traveling bodies of the vehicle for actuating the left and right traveling bodies in respective directions by driving in a driving direction corresponding to an input driving signal, and actuators (72, 73) for at least two working machines, which are provided for each of at least two working machines for actuating the at least two working machines in respective directions by driving in a driving direction corresponding to an input driving signal, and in which the combination of manipulation directions of the first and second control devices (5L, 5R, 15L, 15R) and driving directions of the actuators (33, 34, 72, 73) is changed, wherein a first switching valve (40) for switching the combination of a plurality of input signals and a plurality of output signals and a second switching valve (140) for switching the combination of a plurality of input signals and a plurality of output signals are provided, the first manipulation direction signals which are output from the first control devices (5L, 5R) and the second manipulation direction signals which are output from the second control devices (15L, 15R) are input as input signals to the first switching valve (40) and the second switching valve (140), and a predetermined output signal of the output signals that are output from the first switching valve (40) is input as an input signal to the second switching valve (140), and the output signals, excluding the predetermined output signal input to the second switching valve (140), among the output signals of the first switching valve (40) and the output signals of the second switching valve (140) are input as driving signals to the actuators (33, 34) for the traveling bodies and the actuators (72, 73) for working machines.

The present invention in accordance with the first aspect thereof will be described below with reference to FIG. 1, FIG. 2, FIG. 3, FIG. 6, and FIG. 7.

FIG. 6 illustrates the configuration of a first switching valve 40 shown in FIG. 1, FIG. 2, and FIG. 3. FIG. 7 illustrates the configuration of a second switching valve 140 shown in FIG. 1, FIG. 2, and FIG. 3.

In accordance with the first aspect of the present invention, when operation is conducted according to a first operation pattern S1, a pattern switching lever 46 of the first switching valve 40 is switched to the first operation pattern S1, as shown in FIG. 6, and a pattern switching lever 146 of the second switching valve 140 is switched to the first operation pattern S1, as shown in FIG. 7. As a result, as shown in FIG. 1, a correspondence is established between the manipulation direction signals that are output from the control device 5L, which is one of the two, left and right, first operation devices 5L, 5R, and drive directions of actuators 33, 34 for the left and right traveling bodies. Therefore, the left and right traveling bodies can be actuated by manipulation of only one control lever (left control level 6L).

When operation is conducted according to a second operation pattern S2, the pattern switching lever 46 of the first switching valve 40 is switched to the second operation pattern S2, as shown in FIG. 6, and the pattern switching lever 146 of the second switching valve 140 is switched to the second operation pattern S2, as shown in FIG. 7. As a result, as shown in FIG. 2, a correspondence is established between the manipulation direction signals that are output from the left first control device 5L and drive directions of the actuator 33 for the left traveling body, and between the manipulation direction signals that are output from the right first control device 5R and drive directions of the right travel actuator 34. Therefore, the left and right traveling bodies can be actuated by manipulation of both the left and right control levers 6L, 6R.

When operation is conducted according to the third operation pattern S3, the pattern switching lever 46 of the first switching valve 40 is switched to the third operation pattern S3, as shown in FIG. 6, and the pattern switching lever 146 of the second switching valve 140 is switched to the third operation pattern S3, as shown in FIG. 7. As a result, as shown in FIG. 3, a correspondence is established between the manipulation direction signals that are output from the first control devices 5L, 5R and drive directions of the actuators 33, 34 for traveling bodies.

Furthermore, a correspondence is also established between the manipulation direction signals that are output from the second operation devices 15L, 15R and drive directions of actuators 72, 73 for working machines. Therefore, the working machines can be actuated by foot manipulation of the left and right pedals 16L, 16R, while the left and right traveling bodies are actuated by manipulation of control levers 6L, 6R.

As described above, in accordance with the first aspect of the present invention, when a traveling body is actuated, switching can be conducted between the first operation pattern S1, second operation pattern S2, and third operation pattern S3, controllability of a vehicle such as a skid steer loader is improved, and the burden on the operator is reduced.

In accordance with the second aspect of the present invention, in the apparatus according to the first aspect of the present invention, the first switching valve (40) and the second switching valve (140) are provided in the same body (47).

In accordance with the second aspect of the present invention, as shown in FIG. 9, the first switching valve 40 and the second switching valve 140 are provided in the same body 47. Therefore, various passages such as passages connecting the two switching valves 40, 140 can be shortened and space can be saved.

BRIEF DESCRIPTION OF THE DRAWINGS

FIGS. 15(a), 15(b) and 15(c) respectively illustrate A cross section, B cross section, and C cross section in FIG. 13; those figures illustrate the state relating to switching to the second and third operation patterns;

DESCRIPTION OF THE PREFERRED EMBODIMENTS

The preferred embodiments of the apparatus for changing the combinations of control devices and actuators in accordance with the present invention will be described below with reference to the figures attached. In the embodiments, an assumption is made that the operation patterns are changed in a vehicle such as a skid steer loader.

In a vehicle such as a skid steer loader and the like, working machines are constituted by a boom and a bucket. Furthermore, the bucket is sometimes removed and an attachment such as a cutter and the like is installed.

Figure 5:
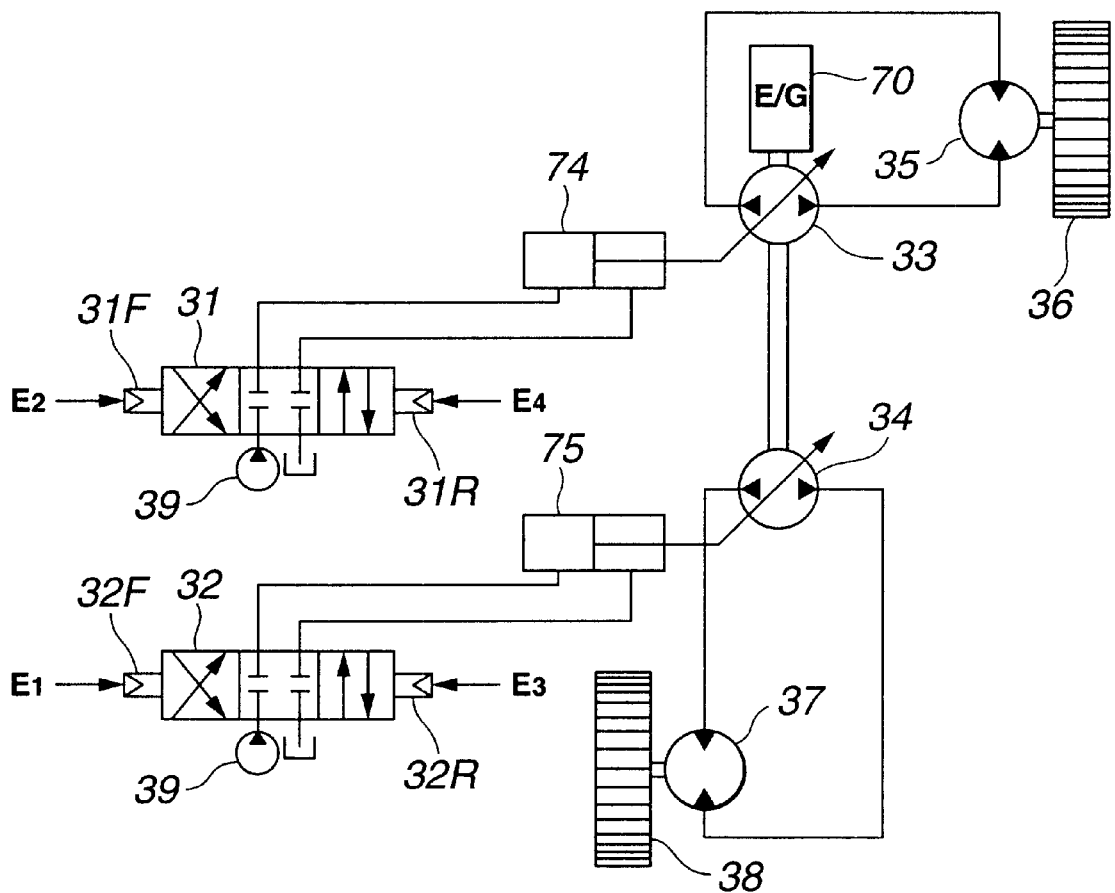
FIG. 5 illustrates hydraulic circuits of the traveling body drive units shown in FIGS. 1, 2 and 3.

A left traveling body (left crawler) 36 and right traveling body (right crawler) 38 are provided, as shown in FIG. 5, at the left and right side of the vehicle body. The left and right traveling bodies (crawlers) 36, 38 are actuated by two, left and right, hydraulic motors 35, 37 for traveling bodies provided at the left and right side of the vehicle body, respectively. The traveling bodies 36, 38 may also be wheels rather than crawlers. Here, HST (hydrostatic transmission or hydrostatic drive) vehicle is assumed. The left and right traveling bodies 36, 38 are independently driven by the hydraulic motors 35, 37 respectively provided at the left and right side of the vehicle body. The traveling body 36 located at the left side of the vehicle body is independently driven and its speed is independently changed by a special drive mechanism provided at the left side. Likewise, the traveling body 38 located at the right side of the vehicle body is independently driven and its speed is independently changed by a special drive mechanism provided at the right side. The left drive mechanism is composed of a hydraulic pump 33 for the left traveling body and hydraulic motor 35 for the left traveling body, and the right drive mechanism is composed of a hydraulic pump 34 for the right traveling body and hydraulic motor 37 for the right traveling body.

Figure 18A:
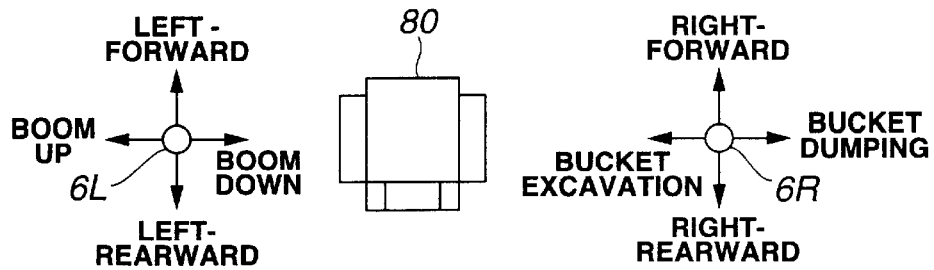
FIGS. 18(a), 18(b), 18(c) and 18(d) are employed to explain various operation patterns of a skid steer loader.
Figure 18B:
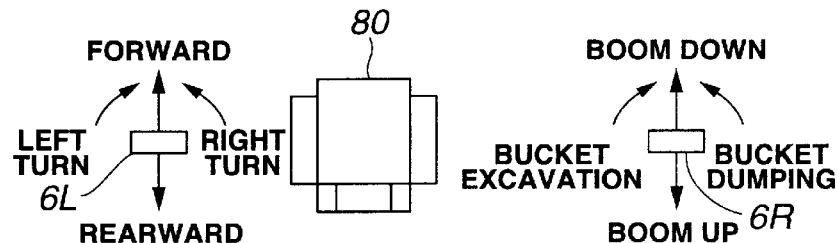
Figure 18C:
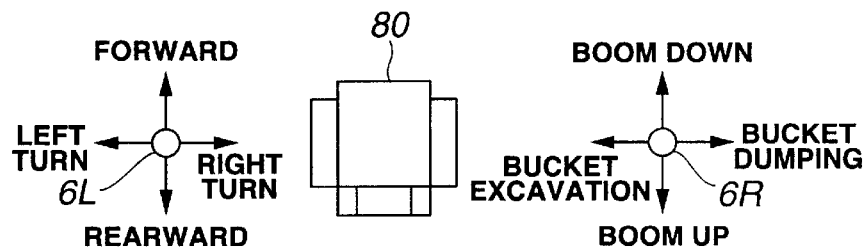
Figure 18D:
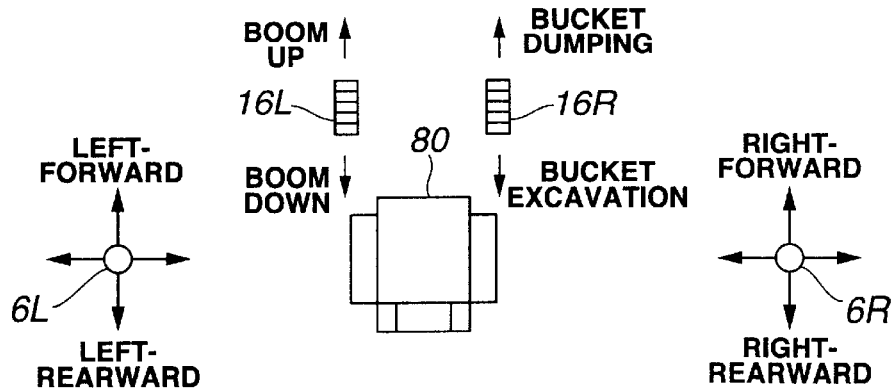
Figure 19:
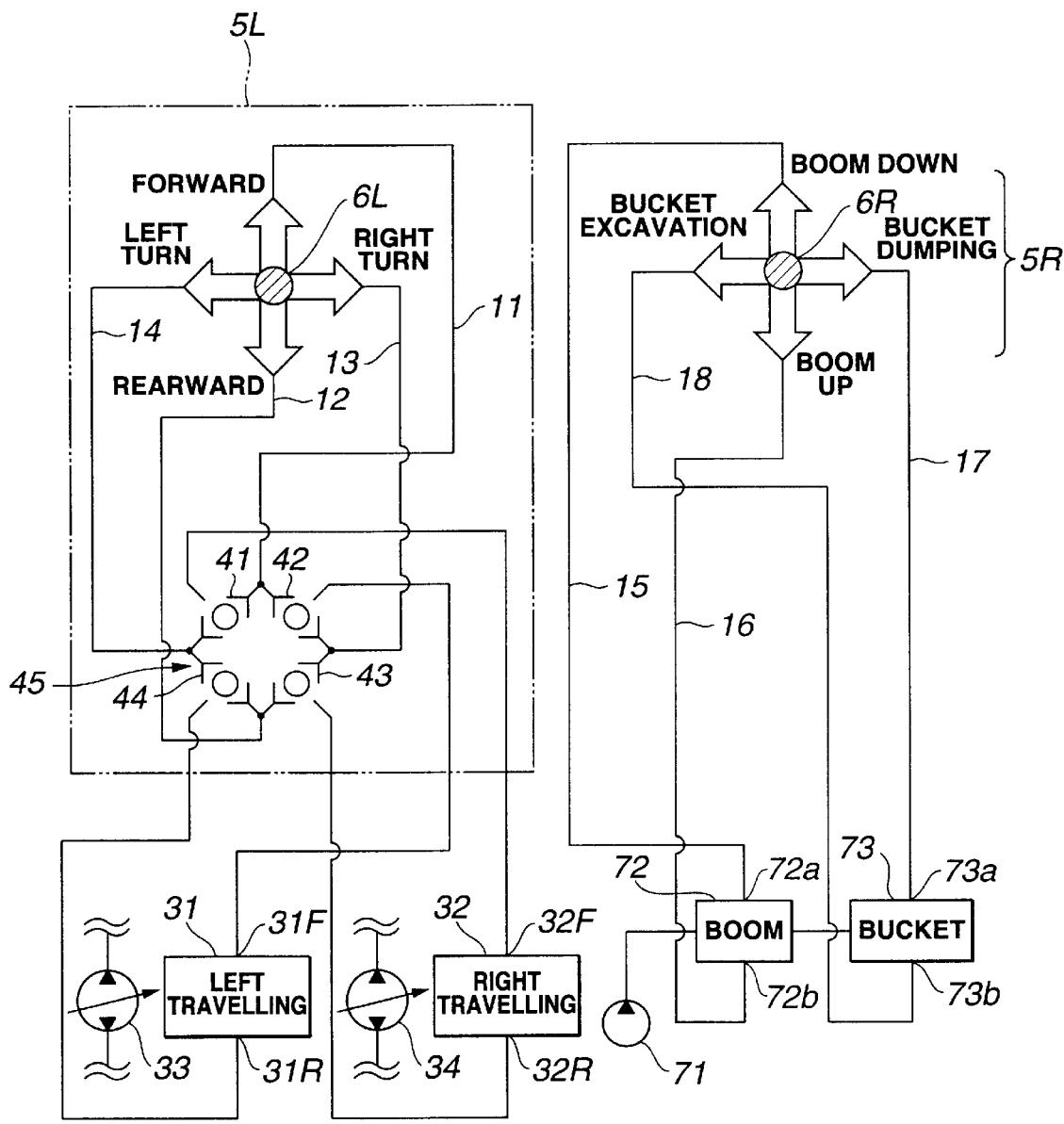
FIG. 19 illustrates a conventional hydraulic circuit of control levers and actuator.
Figure 20:
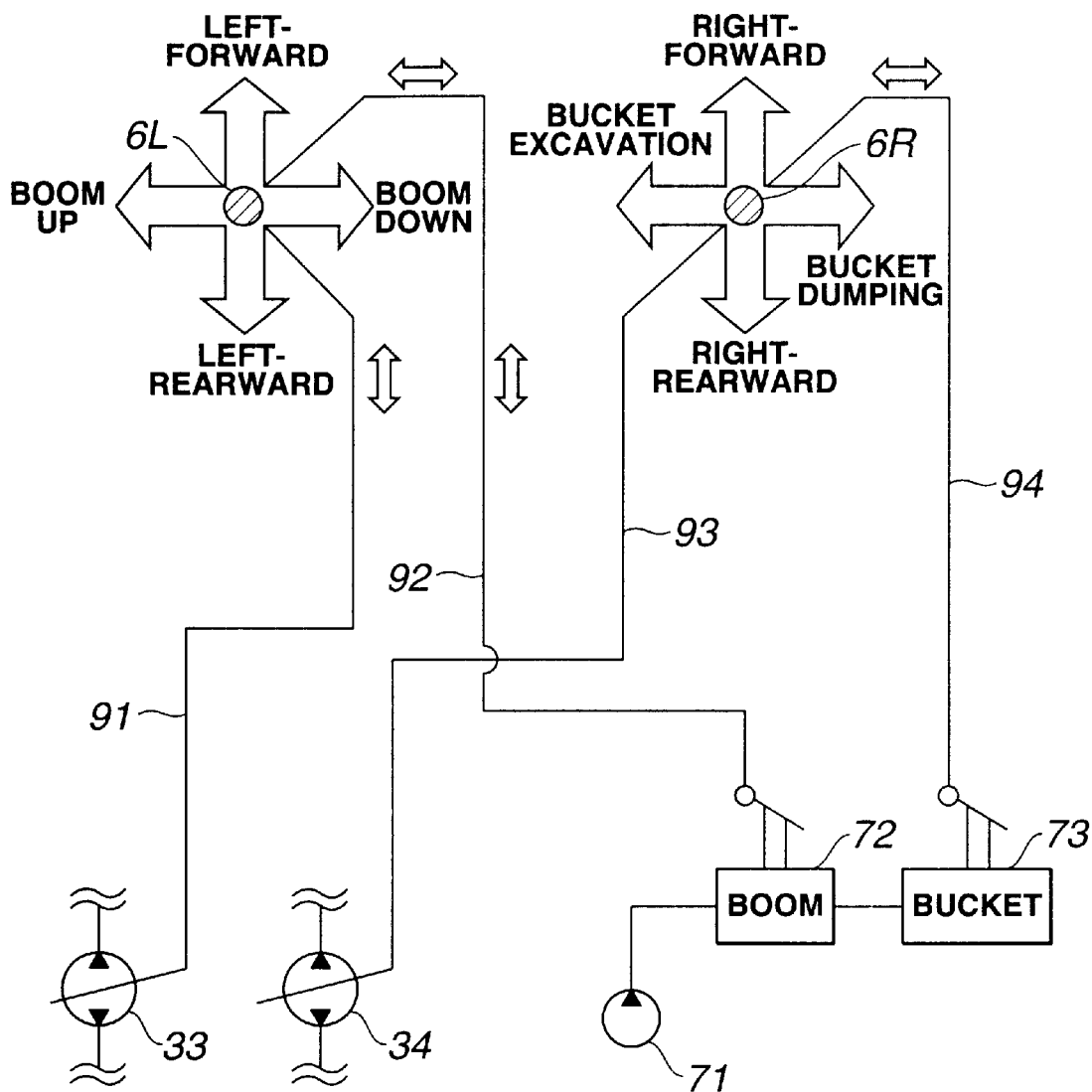
FIG. 20 illustrates a conventional hydraulic circuit of control levers and actuators.

In a vehicle such as a skid steer loader, a total of four traveling bodies and working machines constituted by a boom, a bucket, and two, left and right, traveling bodies 36, 38 are actuated by manipulation of the left and right control levers 6L, 6R provided at the left and right side of the operator's seat 80 or by foot manipulation of the left and right pedals 16L, 16R, as shown in FIGS. 18(a), 18(c) and 18(d).

The combinations (operation patterns) of relationships between the manipulation directions of the two, left and right, control levers 6L, 6R, foot manipulation directions of the two, left and right, pedals 16L, 16R and actuation directions of the four traveling bodies and working machines differ depending on the manufacturer of the skid steer loader. In the present embodiment, an apparatus will be explained which conducts switching between the first operation pattern S1 shown in FIG. 18(c), the second operation pattern S2 shown in FIG. 18(a), and the third operation pattern S3 shown in FIG. 18(d).

Figure 1:
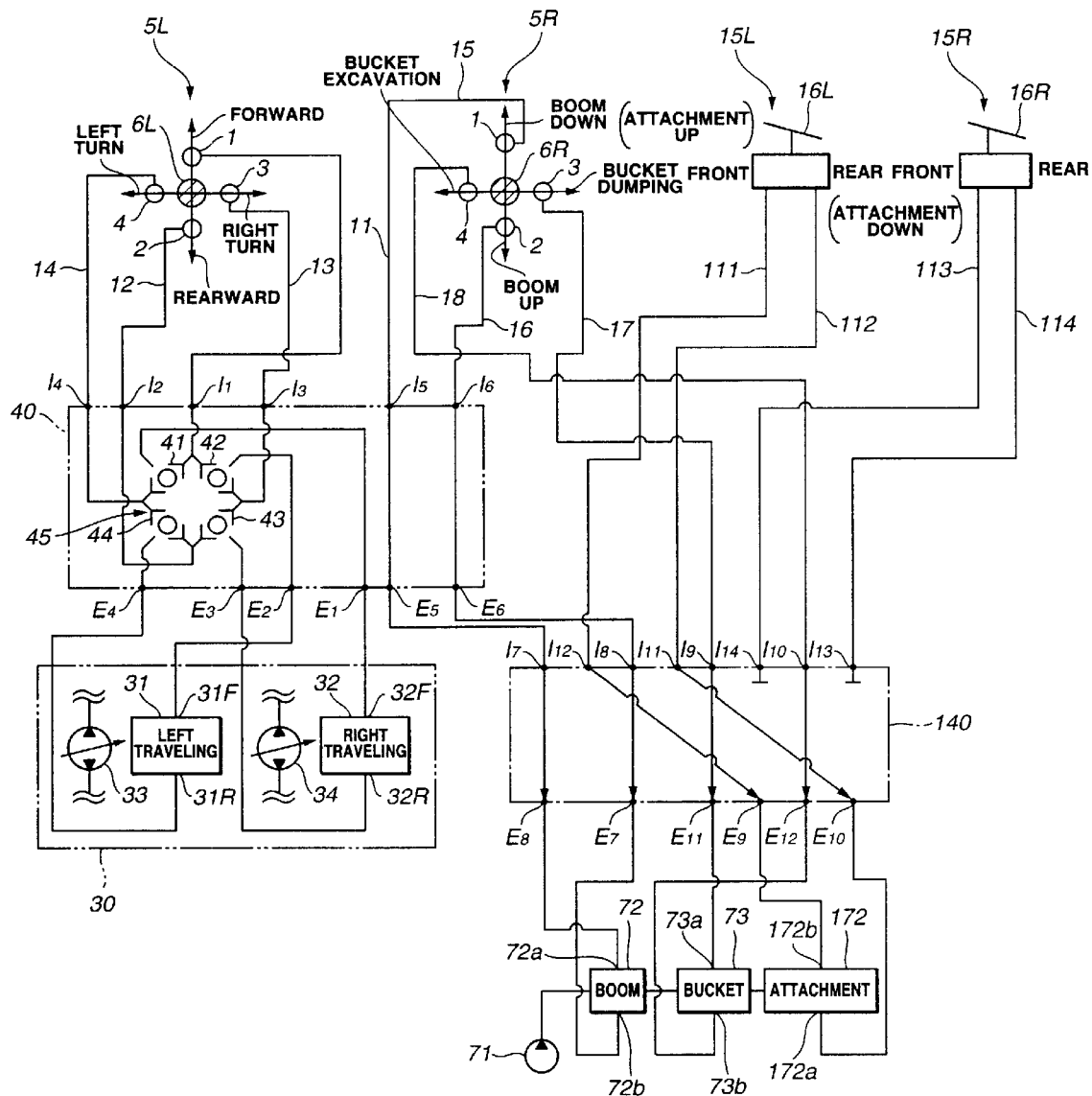
FIG. 1 illustrates a hydraulic circuit diagram relating to switching to the first operation pattern.
Figure 2:
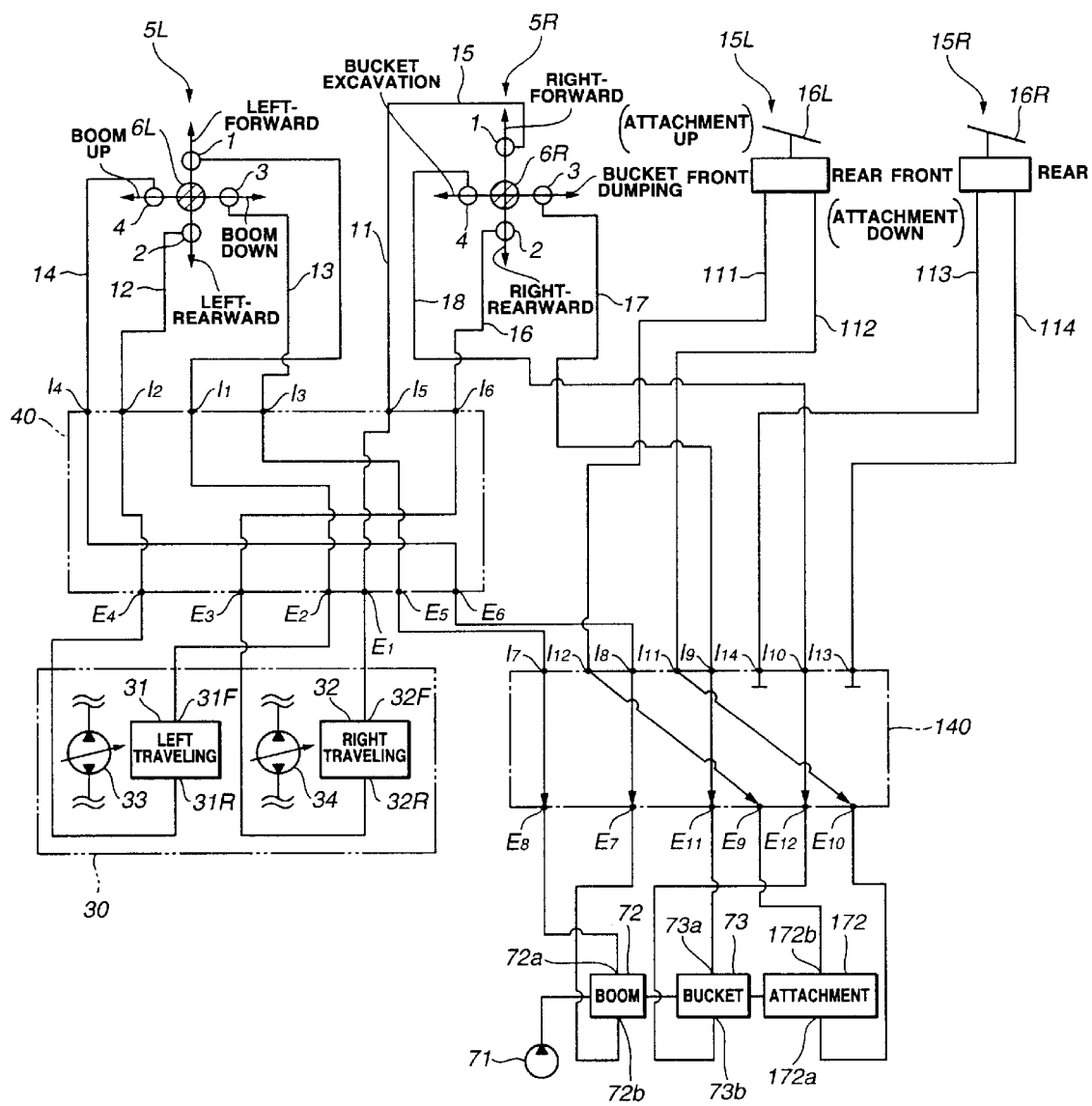
FIG. 2 illustrates a hydraulic circuit diagram relating to switching to the second operation pattern.
Figure 3:
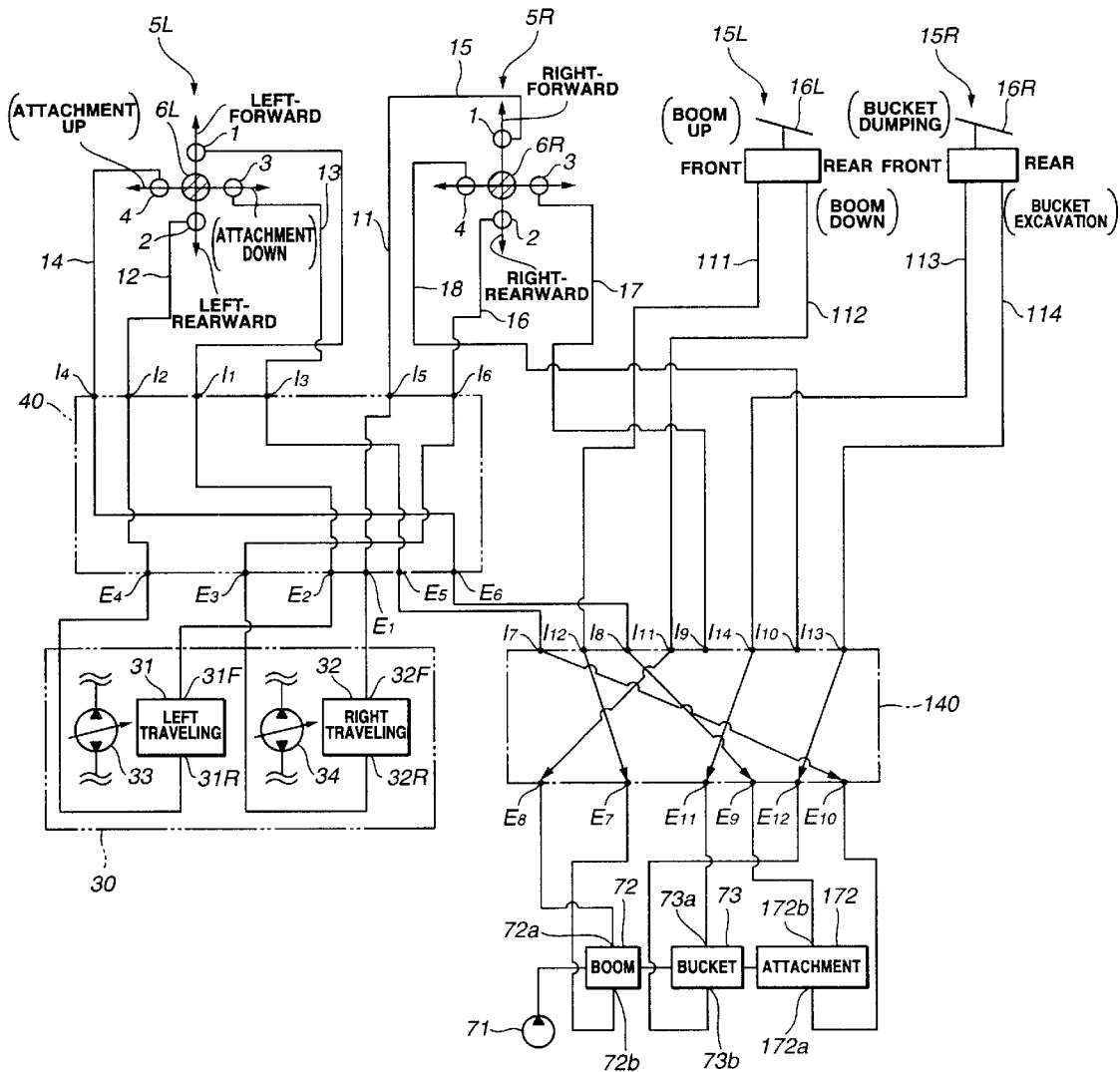
FIG. 3 illustrates a hydraulic circuit diagram relating to switching to the third operation pattern.

FIG. 1 illustrates a hydraulic circuit diagram relating to switching to the first operation pattern S1 in which the left and right traveling bodies 36, 38 are actuated by manipulation of only the left control lever 6L and the boom and bucket are actuated by manipulation of only the right control lever 6R. Furthermore, FIG. 2 illustrates a hydraulic circuit diagram relating to switching to the second operation pattern S2 in which the left and right traveling bodies 36, 38 are actuated by manipulation of both the left and right control levers 6L, 6R and the boom and bucket are operated by manipulation of both the left and right control levers 6L, 6R. FIG. 3 illustrates a hydraulic circuit diagram relating to switching to the third operation pattern S3 in which the left and right traveling bodies 36, 38 are actuated by manipulation of the left and right control levers 6L, 6R and the boom and bucket are actuated by foot manipulation of the left and right pedals 16L, 16R.

Figure 4A:
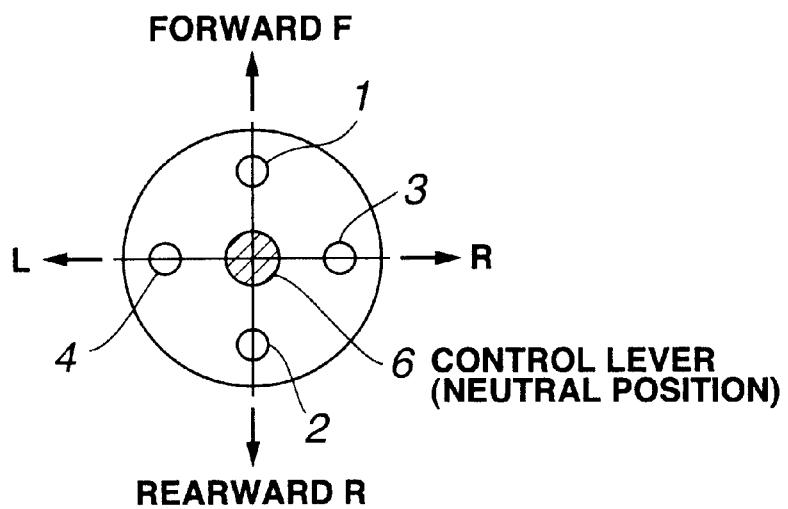
FIGS. 4(a) and 4(b) show the configuration of the control lever devices shown in FIGS. 1, 2 and 3; they illustrate the movement of the vehicle corresponding to the tilting direction of control levers.
Figure 4B:
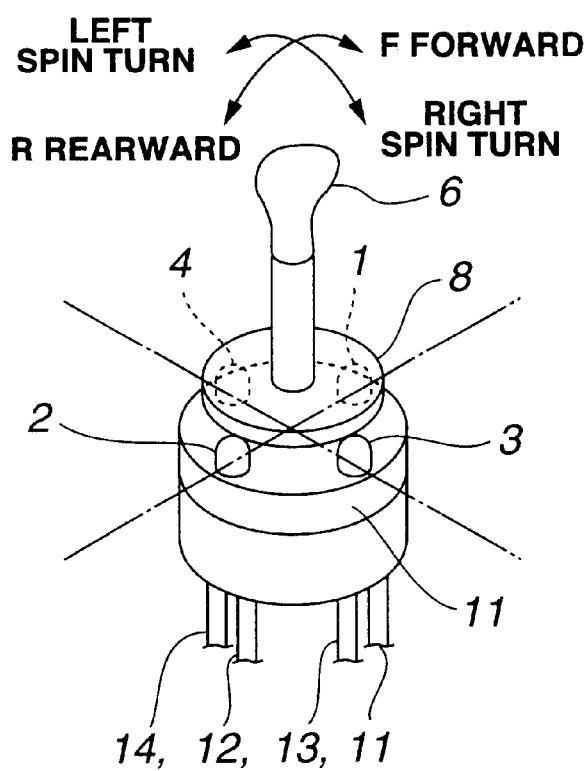

FIGS. 4(a) and 4(b) illustrate the configuration of main components of the control lever device 5L shown in FIGS. 1, 2, and 3.

First, the control lever devices 5L, 5R shown in FIGS. 1, 2, and 3 will be described. Since the left and right control lever devices 5L, 5R have the same structure, the explanation will be given with reference to the left control lever device 5L.

As shown in FIGS. 4(a) and 4(b), the left control lever device 5L is composed of a device body 9 and a left control lever 6L provided so that it can be tilted with respect to the device body 9. The left control lever 6L is attached to the device body 9 via a free joint and a disk plate 8. Four pistons 1, 2, 3, 4 are provided so that the piston ends protrude from the device body 9. Pistons 1, 2, 3, 4 are arranged so at to be positioned in four corners of a square, when viewed from the top surface of the device body 9.

If the left control lever 6L is tilted forward, as shown in FIG. 4(a), the piston 1 is pushed down. If the piston 1 is pushed down, a pilot hydraulic fluid (hydraulic signal) is output to a pilot passage 11. The amount of pilot pressure output from the pilot presage 11 corresponds to the inclination degree of left control lever 6L.

Likewise, if the left control lever 6L is tilted rearward, as shown in FIG. 4(a), the piston 2 is pushed down. If the piston 2 is pushed down, a pilot hydraulic fluid corresponding to the inclination degree of the lever is output to a pilot passage 12. Similarly, if the left control lever 6L is tilted rightward, as shown in FIG. 4(a), the piston 3 is pushed down. If the piston 3 is pushed down, a pilot hydraulic fluid corresponding to the inclination degree of the lever is output to a pilot passage 13. Likewise, if the left control lever 6L is tilted leftward, as shown in FIG. 4(a), the piston 4 is pushed down. If the piston 4 is pushed down, a pilot hydraulic fluid corresponding to the inclination degree of the lever is output to a pilot passage 14.

The right control lever device 5R operates in a similar manner. Thus, pistons 1, 2, 3, 4 are pushed down according to respective manipulation of the right control lever 6R in the forward, rearward, rightward, and leftward direction, and a pilot hydraulic fluid corresponding to the inclination degree of the lever is output to the pilot passage 15, 16, 17, 18, respectively.

On the other hand, is the pedal 16L of left pedal device 15L shown in FIGS. 1, 2, 3 is foot manipulated at the front side and rear side, a pilot hydraulic fluid corresponding to the foot manipulation degree is output to pilot passages 111, 112, respectively. The right pedal device 15R operates in a similar manner. If the pedal 16L thereof is foot manipulated at the front side and rear side, a pilot hydraulic fluid corresponding to the foot manipulation degree is output to pilot passages 113, 114, respectively.

As shown in FIGS. 1, 2, 3, pilot passages 11, 12, 13, 14 of left control lever device 5L are respectively connected to input ports I1, I2, I3, I4 of pattern switching valve 40.

Pilot passages 15, 16 of right control lever device 5R are respectively connected to input ports I5, I6 of pattern switching valve 40.

Pilot passages 17, 18 of right control lever device 5R are respectively connected to input ports I9, I10 of pattern switching valve 140.

Pilot passages 111, 112 of left pedal device 15L are respectively connected to input ports I12, I11 of pattern switching valve 140.

Pilot passages 113, 114 of right pedal device 15R are respectively connected to input ports I14, I13 of pattern switching valve 140.

Output ports E5, E6 of pattern switching valve 40 are respectively connected to input ports I7, I8 of pattern switching valve 140.

Output ports E1, E2, E3, E4 of pattern switching valve 40 are respectively connected to a forward movement side pilot port 32F of right traveling body control valve 32, forward movement side pilot port 31F of left traveling body control valve 31, rearward movement side pilot port 32R of right traveling body control valve 32, and rearward movement side pilot port 31R of left traveling body control valve 31.

Output ports E8, E7 of pattern switching valve 140 are respectively connected to a boom-down side pilot port 72a and boom-up side pilot port 72b of boom control valve 72.

Output ports E11, E12 of pattern switching valve 140 are respectively connected to a bucket-dumping side pilot port 73a and bucket-excavation side pilot port 73b of bucket control valve 73.

Output ports E9, E10 of pattern switching valve 140 are respectively connected to an attachment-up side pilot port 172b and attachment-down side pilot port 172a of attachment control valve 172.

The hydraulic fluid discharged from the pump 71 for working machines is supplied to the boom control valve 72, bucket control valve 73, and attachment control valve 172. In the boom control valve 72, bucket control valve 73, and attachment control valve 172, the direction of discharged hydraulic fluid supplied from the pump 71 for working machines is controlled according to the pilot pressure acting upon the pilot port. The flow rate of the discharge hydraulic fluid is also controlled. The hydraulic fluid controlled by the boom control valve 72, bucket control valve 73, and attachment control valve 172 is respectively supplied to a boom hydraulic cylinder, a bucket hydraulic cylinder, and an attachment hydraulic cylinder (not shown in the figures).

If a pilot pressure (hydraulic signal) acts upon the boom-down pilot port 72a of boom control valve 72 via the output port E8, the boom hydraulic cylinder is driven downward and the boom is accordingly actuated downward. Furthermore, if a pilot pressure acts upon the boom-up side pilot port 72b of boom control valve 72 via the output port E7, the boom hydraulic cylinder is driven upward and the boom is accordingly actuated upward. Likewise, if a pilot pressure acts upon the bucket-dumping side pilot port 73a of bucket control valve 73 via the output port E11, the bucket hydraulic cylinder is driven to the bucket-dumping side and the bucket is accordingly actuated to the dumping side. Furthermore, if a pilot pressure acts upon the bucket-excavation side pilot port 73b of bucket control valve 73 via the output port E12, the bucket hydraulic cylinder is driven to the bucket-excavation side and the bucket is accordingly actuated to the excavation side.

Likewise, if a pilot pressure acts upon the attachment-down side pilot port 172a of attachment control valve 172 via the output port E10, the attachment hydraulic cylinder is driven to the attachment-down side and the attachment is accordingly actuated downward. Furthermore, if a pilot pressure acts upon the attachment-up side pilot port 172b of attachment control valve 172 via the output port E9, the attachment hydraulic cylinder is driven to the attachment-up side and the attachment is accordingly actuated upward.

The configuration of control lever devices 5L, 5R in the present embodiment is such that the pilot hydraulic fluid is output by tilting the control levers. However, as shown in FIG. 18(b), the pilot hydraulic fluid may be also output by rotating the control lever (handle).

The configuration of traveling body driving unit 30 shown in FIGS. 1, 2, 3 will be described below with reference to FIG. 5.

FIG. 5 shows a hydraulic circuit diagram illustrating the configuration of traveling body driving unit 30 shown in FIGS. 1, 2, 3.

A hydraulic fluid discharged from hydraulic pump 39 is supplied to the left traveling body control valve 31. In the left traveling body control valve 31, the direction of the discharged hydraulic fluid supplied from the hydraulic pump 39 and the flow rate of the discharged hydraulic fluid are controlled according to the pilot pressure acting upon the pilot port. The hydraulic fluid controlled by the left traveling body control valve 31 is supplied to the hydraulic cylinder 74 for left pump capacity drive. If the cylinder 74 for left pump capacity drive is driven, the capacity of hydraulic pump 33 for the left traveling body is changed.

Likewise, a hydraulic fluid discharged from hydraulic pump 39 is supplied to the right traveling body control valve 32. In the right traveling body control valve 32, the direction of the discharged hydraulic fluid supplied from the hydraulic pump 39 and the flow rate of the discharged hydraulic fluid are controlled according to the pilot pressure acting upon the pilot port.

The hydraulic fluid controlled by the right traveling body control valve 32 is supplied to the hydraulic cylinder 75 for right pump capacity drive. If the cylinder 75 for right pump capacity drive is driven, the capacity of hydraulic pump 34 for the right traveling body is changed.

The left traveling body (left crawl) 36 is actuated by driving the hydraulic motor 35 for the left traveling body. Thus, the hydraulic motor 35 for the left traveling body is an actuator actuating the movement of left traveling body 36 in two direction: forward and rearward. The hydraulic pump 33 for the left traveling body is driven by an engine 70. The hydraulic fluid discharge openings of the hydraulic pump 33 for the left traveling body are connected by hydraulic passages to the hydraulic inlet openings of hydraulic motor 35 for the left traveling body.

Likewise, the right traveling body (right crawl) 38 is actuated by driving the hydraulic motor 37 for the right traveling body. Thus, the hydraulic motor 37 for the right traveling body is an actuator actuating the movement of right traveling body 38 in two direction: forward and rearward. The hydraulic pump 34 for the right traveling body is driven by the engine 70. The hydraulic fluid discharge openings of the hydraulic pump 34 for the right traveling body are connected by hydraulic passages to the hydraulic inlet openings of hydraulic motor 37 for the right traveling body.

Therefore, if a pilot pressure (hydraulic signal) acts upon the forward movement side pilot port 31F of left traveling body control valve 31 via the output port E2, the capacity of hydraulic pump 33 for the left traveling body changes to the forward side and the left traveling body 36 is accordingly actuated in the forward movement direction F. Furthermore, if a pilot pressure acts upon the rearward movement side pilot port 3R of left traveling body control valve 31 via the output port E4, the capacity of hydraulic pump 33 for the left traveling body changes to the rearward side and the left traveling body 36 is accordingly actuated in the rearward movement direction R.

Likewise, if a pilot pressure acts upon the forward movement side pilot port 32F of right traveling body control valve 32 via the output port E1, the capacity of hydraulic pump 34 for the right traveling body changes to the forward side and the left traveling body 38 is accordingly actuated in the forward movement direction F. Furthermore, if a pilot pressure acts upon the rearward movement side pilot port 32R of right traveling body control valve 32 via the output port E3, the capacity of hydraulic pump 34 for the right traveling body changes to the rearward side and the right traveling body 38 is accordingly actuated in the rearward movement direction R.

The configuration of the pattern switch valve 40 shown in FIG. 1, FIG. 2, and FIG. 3 will be described below with reference to FIG. 6.

Figure 6:
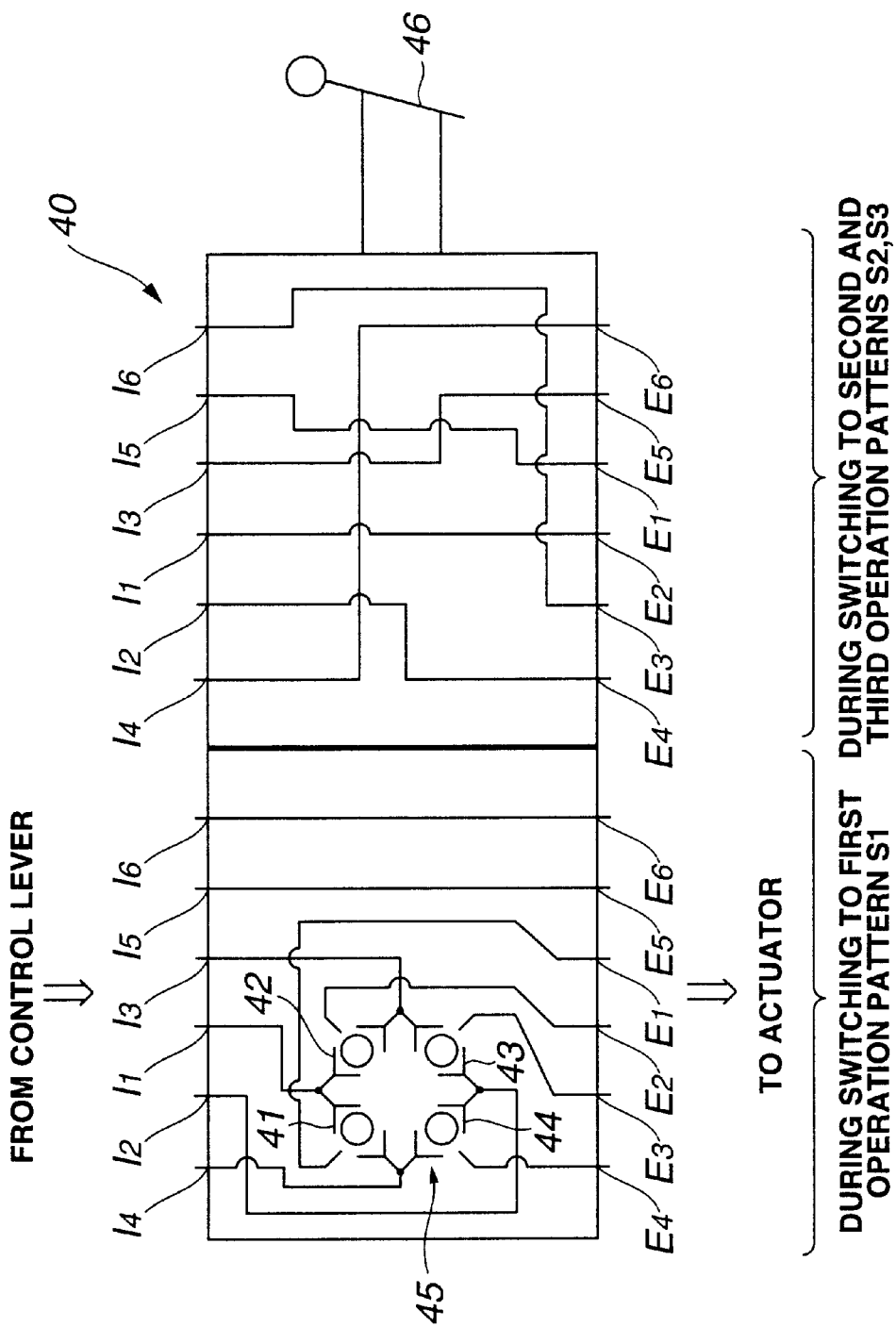
FIG. 6 illustrates the configuration of the first pattern switching valve shown in FIGS. 1, 2 and 3.

FIG. 6 schematically illustrates the structure of the pattern switching valve 40 shown in FIG. 1, FIG. 2, and FIG. 3.

As shown in FIG. 6, the pattern switching valve 40 has a structure such that a valve position can be switched to two positions by manipulation of pattern switching lever 46. The pattern switching valve 40 is provided with a bridge circuit 45 in which four shuttle valves 41, 42, 43, 44 are connected in a circular fashion. Furthermore, the pattern switching valve 40 is provided with input ports I1~I6 and output ports E1~E6.

If the pattern switching lever 46 is manipulated and the pattern switching valve 40 is set to the switching position of the first operation pattern S1 shown at the left side of the figure, the input port I1 is linked to an inlet opening of shuttle valves 41, 42, the input port I2 is linked to the inlet opening of shuttle valves 43, 44, the input port I3 is linked to the inlet opening of shuttle valves 42, 43, and the input port I4 is linked to the inlet opening of shuttle valves 44, 41.

Furthermore, the outlet opening of shuttle valve 41 is linked to the output port E1, the outlet opening of shuttle valve 42 is linked to the output port E2, the outlet opening of shuttle valve 43 is linked to the output port E3, and the outlet opening of shuttle valve 44 is linked to the output port E4. Moreover, the input port I5 is linked to the output port E5, and the input port I6 is linked to the output port E6.

By contrast, if the pattern switching lever 46 is manipulated and the pattern switching valve 40 is set to the switching position of the second operation pattern S2 and third operation pattern S3 shown at the right side of the figure, the input port I1 is connected to the output port E2. At the same time, the input port I2 is connected to the output port E4, the input port I3 is connected to the output port E5, the input port I4 is connected to the output port E6, the input port I5 is connected to the output port E1, and the input port I6 is connected to the output port E3.

Figure 7:
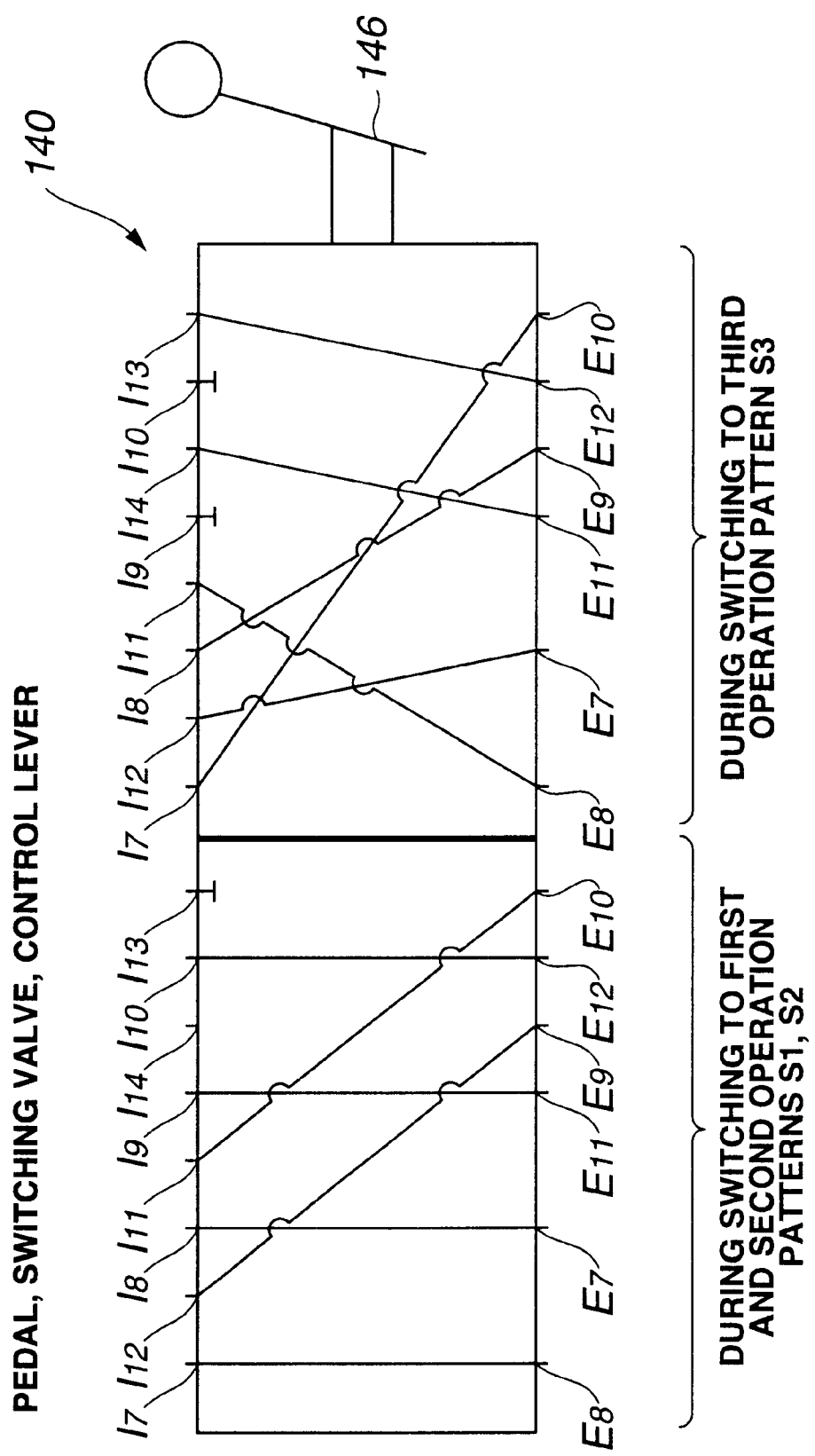
FIG. 7 illustrates the configuration of the second pattern switching valve shown in FIGS. 1, 2 and 3.

FIG. 7 schematically illustrates the structure of the pattern switching valve 140 shown in FIG. 1, FIG. 2, and FIG. 3.

As shown in FIG. 7, the pattern switching valve 140 has a structure such that a valve position can be switched to two positions by manipulation of pattern switching lever 146. The pattern switching valve 140 is provided with input ports I7~I14 and output ports E7~E12.

If the pattern switching lever 146 is manipulated and the pattern switching valve 140 is set to the switching position of the first operation pattern S1 and second operation pattern S2 shown at the left side of the figure, the input port I7 is connected to the output port E8, the input port I8 is connected to the output port E7, the input port I9 is connected to the output port E11, the input port I10 is connected to the output port E12, the input port I11 is connected to the output port E10, and the input port I12 is connected to the output port E9.

By contrast, if the pattern switching lever 146 is manipulated and the pattern switching valve 140 is set to the switching position of the third operation pattern S3 shown at the right side of the figure, the input port I7 is connected to the output port E10. At the same time, the input port I8 is connected to the output port E9, the input port I11 is connected to the output port E8, the input port I12 is connected to the output port E7, the input port I13 is connected to the output port E12, and the input port I14 is connected to the output port E11.

The configuration of the present embodiment is such that the valve positions of pattern switching valves 40, 140 are switched according to manipulation of pattern switching levers 46, 146. However, any designated control means such as a switch, a button, and the like, and not only the lever, can be used, provided that such means can designate changes of operation pattern combinations. Moreover, the pattern switching valves 40, 140 may be actuated not only by manual operation, but also by electric signals, hydraulic signals, and the like. For example, valve positions can be switched by generating an electric signal according to the switch operation and supplying it to the pattern switching valves 40, 140.

The operation of the above-described apparatus for changing combinations will be described below.

If the pattern switching lever 46 is manipulated into a position corresponding to the first operation pattern S1, as shown in FIG. 6, the valve position of the pattern switching valve 40 is set to the switching position of the first operation pattern S. At the same time, if the pattern switching lever 146 is manipulated into a position corresponding to the first operation pattern S1, as shown in FIG. 7, the valve position of the pattern switching valve 140 is set to the switching position of the first operation pattern S1. A hydraulic circuit used in this process is shown in FIG. 1.

Thus, the pilot passages 11, 12, 13, 14 connected to the left control lever device 5L are respectively connected to inlet openings of shuttle valves 41, 42, shuttle valves 43, 44, shuttle valves 42, 43, and shuttle valves 44 41. Furthermore, the outlet openings of shuttle valves 41, 42, 43, 44 are respectively connected to pilot ports 32F, 31F, 32R, 31R of the left and right traveling body control valves 31, 32. Therefore, the left and right traveling bodies 36, 38 can be actuated by manipulation of only the left control lever 6L.

More specifically, if the left control lever 6L is manipulated in the forward direction, only piston 1 is pushed down. Therefore, a pilot pressure is produced only in the pilot passage 11. The pilot pressure acts upon the forward movement side pilot ports 32F, 31F of the left and right traveling body control valves 31, 32 via the input port I1 of the pattern switching valve 40, inlet openings of two shuttle valves 41, 42, outlet openings of shuttle valves 41, 42, and output ports E1, E2 of pattern switching valve 40. As a result, the left and right traveling bodies 36, 38 are actuated in the forward movement direction F at the same speed.

Furthermore, if the left control lever 6L is manipulated in the rearward direction, only piston 2 is pushed down. Therefore, a pilot pressure is produced only in the pilot passage 12. The pilot pressure acts upon the rearward movement side pilot ports 32R, 31R of the left and right traveling body control valves 31, 32 via the input port I2 of the pattern switching valve 40, inlet openings of two shuttle valves 43, 44, outlet openings of shuttle valves 43, 44, and output ports E3, E4 of pattern switching valve 40. As a result, the left and right traveling bodies 36, 38 are actuated in the rearward movement direction R at the same speed.

Moreover, if the left control lever 6L is manipulated in the rightward direction, only piston 3 is pushed down. Therefore, a pilot pressure is produced only in the pilot passage 13. The pilot pressure acts upon the forward movement side pilot port 31F of the left traveling body control valve 31 and the rearward movement side pilot port 32R of the right traveling body control valve 32 via the input port 13 of the pattern switching valve 40, inlet openings of two shuttle valves 42, 43, outlet openings of shuttle valves 42, 43, and output ports E2, E3 of pattern switching valve 40.

As a result, the left and right traveling bodies 36, 38 are actuated at the same speed in the forward movement direction F and rearward movement direction R, respectively. This action is usually called a right spin turn.

If the left control lever 6L is manipulated in the leftward direction, only piston 4 is pushed down. Therefore, a pilot pressure is produced only in the pilot passage 14. The pilot pressure acts upon the rearward movement side pilot port 31R of the left traveling body control valve 31 and the forward movement side pilot port 32F of the right traveling body control valve 32 via the input port I4 of the pattern switching valve 40, inlet openings of two shuttle valves 44, 41, outlet openings of shuttle valves 44, 41, and output ports E4, E1 of pattern switching valve 40. As a result, the left and right traveling bodies 36, 38 are actuated at the same speed in the rearward movement direction R and forward movement direction F, respectively. This action is usually called a left spin turn.

A case in which the left control lever 6L is manipulated in the rightward-forward direction, that is, in the direction between the forward and rightward directions, will be described below.

The piston 1 and piston 3 of the left control lever device 5L are pushed down by tilting the left control lever 6L. A pilot pressure generated by the piston 1 acts upon the two shuttle valves 41, 42 via the passage 11. A pilot pressure generated in piston 3 acts upon the two shuttle valves 42, 43 via the passage 13. At this time, the shuttle valve 42 outputs a pressure of the passage 11 or passage 13, whichever is higher. The output pilot pressure acts upon the forward movement side pilot port 31F of the control valve 31 for the left traveling body. As a result, the hydraulic pump 33 for the left traveling body controls the capacity in the forward direction and the left traveling body advances forward.

The shuttle valve 41 outputs the pilot pressure of passage 11 to the forward movement side pilot port 32F of the right traveling body control valve 32.

The shuttle valve 43 outputs the pilot pressure of passage 13 to the rear movement side pilot port 32R of the right traveling body control valve 32.

At this time, in the control valve for the right traveling body, the pilot pressure acts both frontward and rearward. Therefore, the capacity of the hydraulic pimp for the right traveling body is controlled in the forward direction, to stop the movement, or in the rearward direction according to the difference in pressure between the passage 11 and passage 13.

The speed of the left traveling body 36 in this case is determined by the pressure in the passage 11 or passage 13, whichever is higher. The speed of the right traveling body 38 is determined according to the difference in pressure between the passage 11 and passage 13.

Therefore, normally, the speed of the left traveling body is higher. As a result, the vehicle turns and advances forward and to the right. The degree of the turn is determined by the difference in pressure between the passage 11 and passage 13, that is, by the tilting direction of the left control lever 6L.

In this embodiment, the output pressure of passage 11 is the same as that of passage 13 when the lever is tilted at an angle of 45 degrees in the rightward-forward direction. As a result, the right traveling body 38 stops and only the left traveling body 36 moves forward when the lever is tilted at an angle of 45 degrees in the rightward-forward direction.

When the left control lever 6L is tilted in the leftward-forward direction, the vehicle turns and advances forward and to the left.

When the left control lever 6L is tilted in the rightward-rearward direction, the vehicle turns and moves rearward and to the left, and when the lever is tilted in the leftward-rightward direction, the vehicle turns and moves rearward and to the right.

Furthermore, the pilot passages 15, 16, 17, 18 connected to the right control lever device 5R are respectively connected to pilot ports 72a, 72b, 73a, 73b of a boom control valve 72 and bucket control valve 73. Therefore, the boom and bucket can be actuated by manipulation of only the right control lever 6R.

If the right control lever 6R is manipulated in the forward direction, the pilot pressure generated in the pilot passage 15 acts upon the boom-down pilot port 72a of the boom control valve 72 via the input port I5 and output port E5 of pattern switching valve 40 and via the input port I7 and output port E8 of pattern switching valve 140. As a result, the boom is actuated downward.

If the right control lever 6R is manipulated in the rearward direction, the pilot pressure generated in the pilot passage 16 acts upon the boom-up side pilot port 72b of the boom control valve 72 via the input port I6 and output port E6 of the pattern switching valve 40 and via the input port I8 and output port E7 of pattern switching valve 140. As a result, the boom is actuated upward.

If the right control lever 6R is manipulated in the rightward direction, the pilot pressure generated in the pilot passage 17 acts upon the bucket-dumping side pilot port 73*a* of the bucket control valve 73 via the input port 19 and output port E11 of pattern switching valve 140. As a result, the bucket is actuated to the dumping side.

If the right control lever 6R is manipulated in the leftward direction, the pilot pressure generated in the pilot passage 18 acts upon the bucket-excavation side pilot port 73*b* of the bucket control valve 73 via the input port I10 and output port E12 of the pattern switching valve 140. As a result, the bucket is actuated to the excavation side.

When an attachment is installed, the following motion is executed.

Thus, if the left pedal 16L is foot manipulated at the rear side, the pilot pressure generated in the pilot passage 112 acts upon the attachment-down side pilot port 172*a* of the attachment control valve 172 via the input port I11 and output port E10 of the pattern switching valve 140. As a result, the attachment is actuated downward.

Furthermore, if the left pedal 16L is foot manipulated at the front side, the pilot pressure generated in the pilot passage 111 acts upon the attachment-up side pilot port 172*b* of the attachment control valve 172 via the input port I12 and output port E9 of the pattern switching valve 140. As a result, the attachment is actuated upward.

A case in which the pattern switching lever 46 is manipulated to the position corresponding to the second operation pattern S2, as shown in FIG. 6, and in which the pattern switching lever 146 is manipulated to the position corresponding to the second operation pattern S2, as shown in FIG. 7, will be described below. At this time, the valve position of the pattern switching valve 40 is set to the switching position of the second operation pattern S2 and the valve position of the pattern switching valve 140 is set to the switching position of the second operation pattern S2. A hydraulic circuit relating to this state is shown in FIG. 2.

Thus, the pilot passages 11, 12, 13, 14 connected to the left control lever device 5L are respectively connected to pilot ports 31F, 31R of the left traveling body control valve 31 and to the pilot ports 72*a*, 72*b* of the boom control valve 72, without connection via the bridge circuit 45. Therefore, the left traveling body 36 and boom can be actuated by manipulation of the left control lever 6L.

Furthermore, the pilot passages 15, 16, 17, 18 connected to the right control lever device 5R are respectively connected to pilot ports 32F, 32R of the right traveling body control valve 32 and to the pilot ports 73*a*, 73*b* of the bucket control valve 73. Therefore, the right traveling body 38 and bucket can be actuated by manipulation of the right control lever 6R.

More specifically, if the left control lever 6L is manipulated in the forward direction, the pilot pressure generated in the pilot passage 11 acts upon the forward movement side pilot port 31F of the left traveling body control valve 31 via the input port I1 and output port E2 of pattern switching valve 40. As a result, the left traveling body 36 is actuated in the forward movement direction F and the vehicle advances forward and to the left.

Furthermore, if the left control lever 6L is manipulated in the rearward direction, the pilot pressure generated in the pilot passage 12 acts upon the rearward movement side pilot port 31R of the left traveling body control valve 31 via the input port 12 and output port E4 of pattern switching valve 40. As a result, the left traveling body 36 is actuated in the rearward movement direction R and the vehicle moves rearward and to the left.

Moreover, if the left control lever 6L is manipulated in the rightward direction, the pilot pressure generated in the pilot passage 13 acts upon the boom-down pilot port 72*a* of the boom control valve 72 via the input port 13 and output port E5 of pattern switching valve 40 and via the input port 17 and output port E8 of pattern switching valve 140. As a result, the boom is actuated downward.

Furthermore, if the left control lever 6L is manipulated in the leftward direction, the pilot pressure generated in the pilot passage 14 acts upon the boom-up side pilot port 72*b* of the boom control valve 72 via the input port I4 and output port E6 of pattern switching valve 40 and via the input port I8 and output port E7 of pattern switching valve 140. As a result, the boom is actuated upward.

On the other hand, if the right control lever 6R is manipulated in the forward direction, the pilot pressure generated in the pilot passage 15 acts upon the forward movement side pilot port 32F of the right traveling body control valve 32 via the input port I5 and output port E1 of pattern switching valve 40. As a result, the right traveling body 38 is actuated in the forward movement direction F and the vehicle advances forward and to the right.

Furthermore, if the right control lever 6R is manipulated in the rearward direction, the pilot pressure generated in the pilot passage 16 acts upon the rearward movement side pilot port 32R of the right traveling body control valve 32 via the input port I6 and output port E3 of pattern switching valve 40. As a result, the right traveling body 38 is actuated in the rearward movement direction R and the vehicle moves rearward and to the right.

Moreover, if the right control lever 6R is manipulated in the rightward direction, the pilot pressure generated in the pilot passage 17 acts upon the bucket-dumping side pilot port 73*a* of the bucket control valve 73 via the input port 19 and output port E11 of pattern switching valve 140. As a result, the bucket is actuated to the dumping side.

Furthermore, if the right control lever 6R is manipulated in the leftward direction, the pilot pressure generated in the pilot passage 18 acts upon the bucket-excavation side pilot port 73*b* of the bucket control valve 73 via the input port I10 and output port E12 of pattern switching valve 140. As a result, the bucket is actuated to the excavation side.

When an attachment is installed, then, similarly to the case illustrated by FIG. 1, if the left pedal 16L is foot manipulated at the front side, the attachment is actuated downward, and if the left pedal 16L is foot manipulated at the front side, the attachment is actuated upward.

As described above, upon switching to the second operation pattern S2, manipulation of both the left and right control levers 6L, 6R moves the vehicle forward and rearward, advances it forward and turns to the left and right, moves it rearward and turns to the left and right, and spin turns to the left and right.

A case in which the pattern switching lever 46 is manipulated to the position corresponding to the third operation pattern S3, as shown in FIG. 6, and a case in which the pattern switching lever 146 is manipulated to the position corresponding to the third operation pattern S3, as shown in FIG. 7, will be described below. At this time the valve position of pattern switching valve 40 is set to switching position of the third operation pattern S3, and the valve position of pattern switching lever 140 is set to switching position of the third operation pattern S3. The hydraulic circuit relating to this state is shown in FIG. 3.

Thus, the pilot passages 11, 12 connected to the left control lever device 5L are respectively connected to pilot ports 31F, 31R of the left traveling body control valve 31, without being connected via the bridge circuit 45. Therefore, the left traveling body 36 can be actuated by manipulation the left control lever 6L.

Furthermore, the pilot pipes 15, 16 connected to the left control lever device 5R are respectively connected to pilot ports 32F, 32R of right traveling body control valve 32. Therefore, the right traveling body 38 can be actuated by manipulation of the right control lever 6R.

Moreover, the pilot pipes 111, 112 connected to the left pedal device 15L are respectively connected to the pilot ports 72b, 72a of boom control valve 72. Therefore, the boom can be actuated by foot manipulation of the left pedal 16L.

The pilot passages 113, 114 connected to the right pedal device 15R are respectively connected to the pilot ports 73a, 73b of the bucket control valve 73. Therefore, the bucket can be actuated by foot manipulation of the right pedal 16R.

More specifically, if the left control lever 6L is manipulated in the forward direction, the pilot pressure generated in the pilot passage 11 acts upon the forward movement side pilot port 31F of left traveling body control valve 31 via the input port I1 and output port E2 of pattern switching valve 40. As a result, the left traveling body 36 is actuated in the forward movement direction F and the vehicle advances forward and to the left.

Furthermore, if the left control lever 6L is manipulated in the rearward direction, the pilot pressure generated in the pilot passage 12 acts upon the rearward movement side pilot port 31R of the left traveling body control valve 31 via the input port I2 and output port E4 of the pattern switching valve 40. As a result, the left traveling body 36 is actuated in the rearward movement direction R, and the vehicle moves rearward and to the left.

On the other hand, if the right operation lever 6R is manipulated in the forward direction, the pilot pressure generated in the pilot passage 15 acts upon the forward movement side pilot port 32F of the right traveling body control valve 32 via the input port I5 and output port E1 of the pattern switching valve 40. As a result, the right traveling body 38 is actuated in the forward movement direction F and the vehicle advances forward and to the right.

Furthermore, if the right operation lever 6R is manipulated in the rearward direction, the pilot pressure generated in the pilot passage 16 acts upon the rearward movement side pilot port 32R of the right traveling body control valve 32 via the input port I6 and output port E3 of the pattern switching valve 40. As a result, the right traveling body 38 is actuated in the rearward movement direction R and the vehicle moves rearward and to the right.

Moreover, if the left pedal 16L is foot manipulated at the rear side, the pilot pressure generated in the pilot passage 112 acts upon the boom-down pilot port 72a of the boom control valve 72 via the input port I11 and output port E8 of the pattern switching valve 140. As a result, the boom is actuated upward.

If the left pedal 16L is foot manipulated at the front side, the pilot pressure generated in the pilot passage 111 acts upon the boom-up side pilot port 72b of the boom control valve 72 via the input port I12 and output port E7 of the pattern switching valve 140. As a result, the boom is actuated downward.

Furthermore, if the right pedal 16R is foot manipulated at the rear side, the pilot pressure generated in the pilot passage 114 acts upon the bucket-excavation side pilot port 73b of the bucket control valve 73 via the input port I13 and output port E12 of the pattern switching valve 140. As a result, the bucket is actuated to the excavation side.

Moreover, if the right pedal 16R is foot manipulated at the front side, the pilot pressure generated in the pilot passage 113 acts upon the bucket-dumping side pilot port 73a of the bucket control valve 73 via the input port I14 and output port E11 of the pattern switching valve 140. As a result, the bucket is actuated to the dumping side.

In case an attachment is installed, the following motion is executed.

Thus, if the left control lever 6L is manipulated in the rightward direction, the pilot pressure generated in the pilot passage 13 acts upon the attachment-down side pilot port 172a of attachment control valve 172 via the input port I3 and output port E5 of pattern switching valve 40 and via the input port I7 and output port E10 of pattern switching valve 140. As a result, the attachment is actuated downward.

Furthermore, if the left control lever 6L is manipulated in the leftward direction, the pilot pressure generated in the pilot passage 14 acts upon the attachment-up side pilot port 172b of the attachment control valve 172 via the input port I4 and output port E6 of pattern switching valve 40 and via the input port I8 and output port E9 of pattern switching valve 140. As a result, the attachment is actuated upward.

As described above, upon switching to the third operation pattern S3, manipulation of both the left and right control levers 6L, 6R moves the vehicle forward and rearward, advances it forward and turns to the left and right, moves it rearward and turns to the left and right, and spin turns it to the left and right. Moreover, foot manipulation of both the left and right pedals 16L, 16R rises and lowers the boom and actuates the bucket for excavation and dumping.

With the present embodiment, as described above, when the traveling bodies 36, 38 and working machines such as boom, bucket, and the like are activated, switching can be conducted to the first operation pattern S1, second operation pattern S2, and third operation pattern S3, controllability of a vehicle such as a skid steer loader can be improved and the burden on the operator can be reduced.

Examples of specific configurations of pattern switching valves 40, 140 will be described below with reference to FIGS. 9~17.

Figure 9:
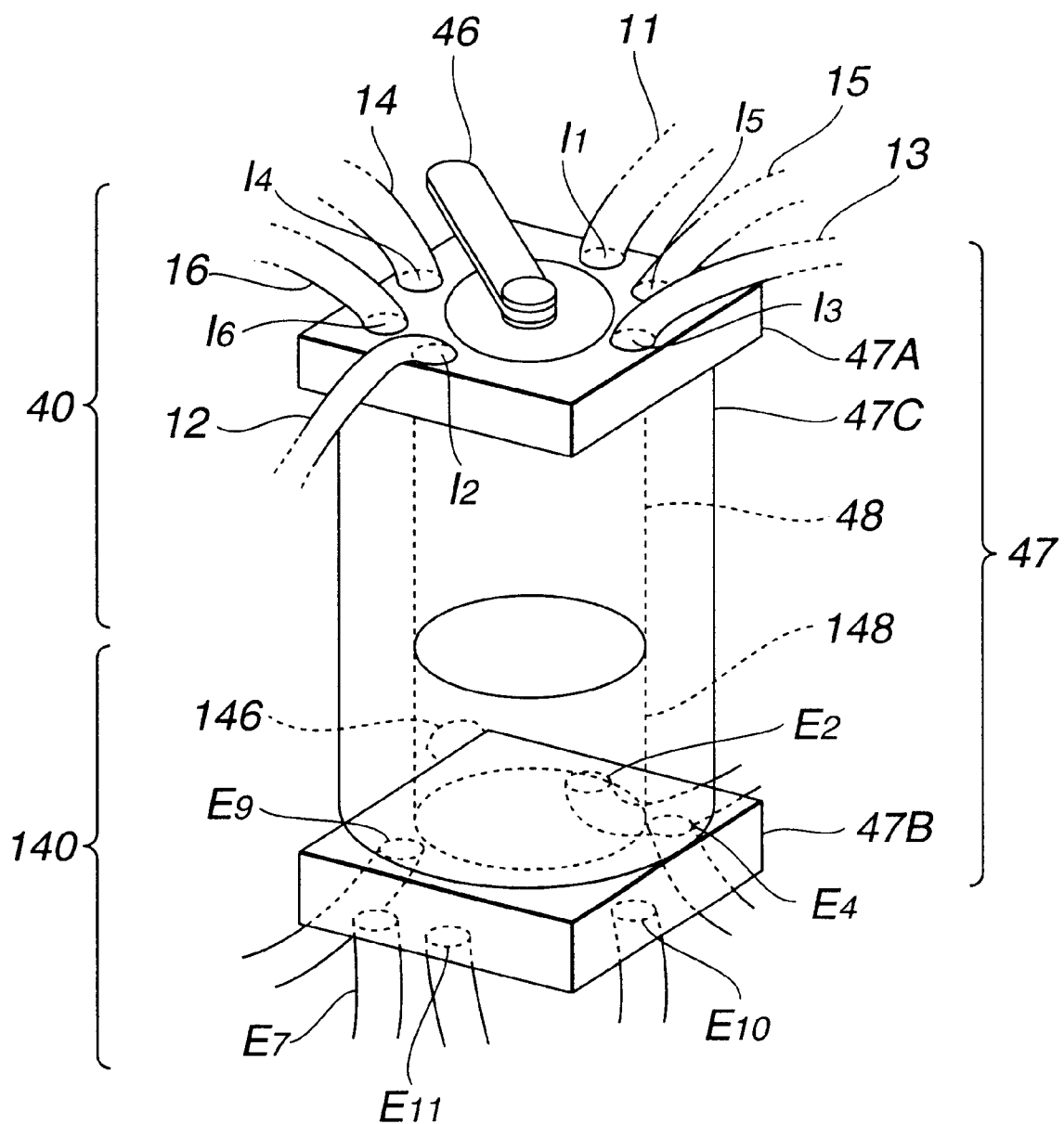
FIG. 9 is a perspective view illustrating an example of specific configuration of pattern switching valve shown in FIGS. 6 and 7.

FIG. 9 is a perspective view of pattern switching valves 40, 140. As shown in FIG. 9, the two pattern switching valves 40, 140 are provided in the same body 47.

The pattern switching valve 40 is composed of a cylindrical piston 48 connected to the pattern switching lever 46 and the body 47. The pattern switching valve 140 is composed of a cylindrical piston 148 connected to the pattern switching lever 146 and body 47. The body 47 has a function of a cylinder containing pistons 48, 148 that are free to slide therein. The body 47 is composed of three structural parts: body upper portion 47A, body central portion 47C, and body lower portion 47B. The pattern switching lever 46 is attached to the body upper portion 47A, and the pattern switching lever 146 is attached to the body lower portion 47B.

Figure 10:
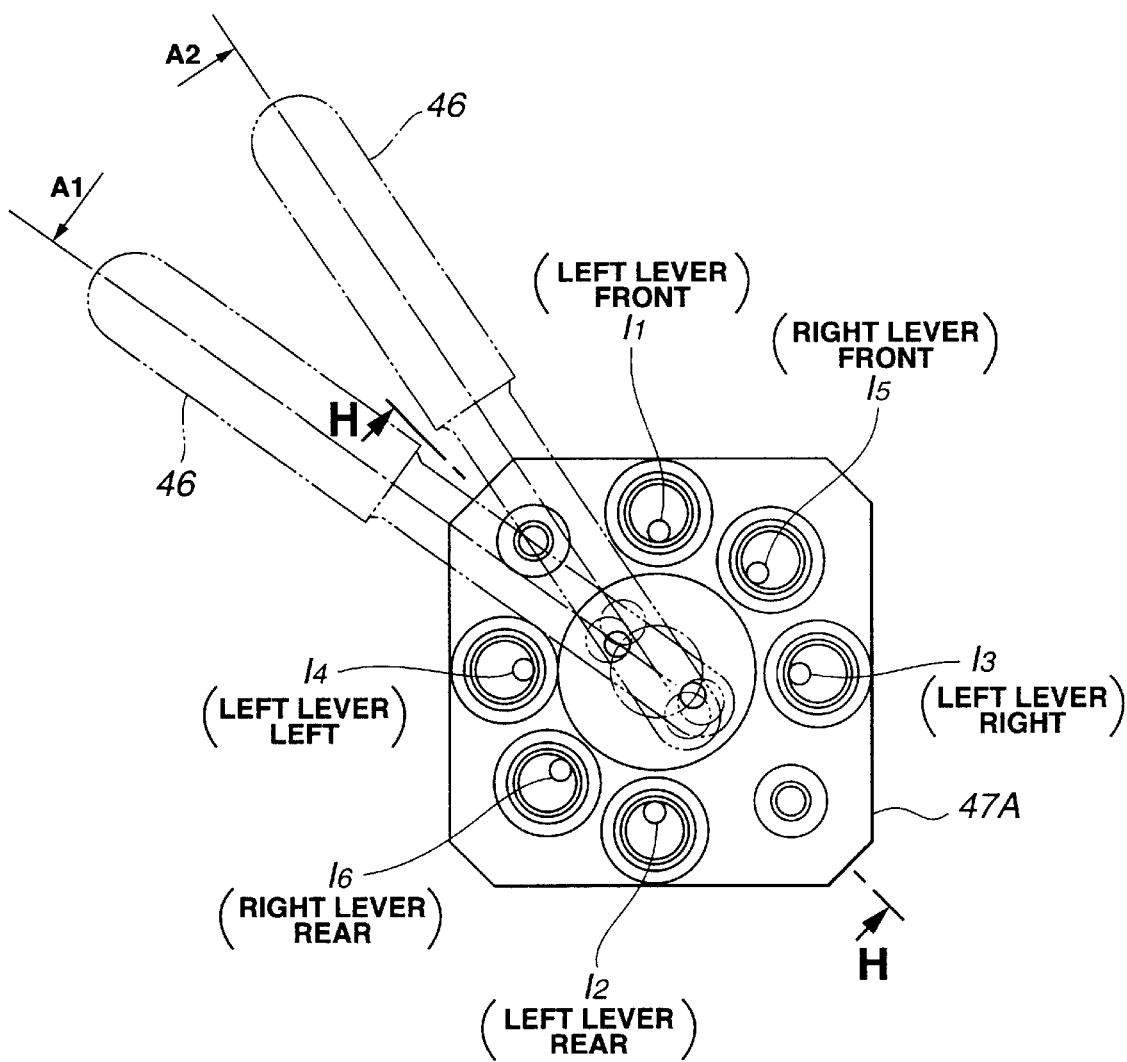
FIG. 10 is a view illustrating the top surface of pattern switching valve shown in FIG. 9.

FIG. 10 is a top view of pattern switching valves 40, 140 shown in FIG. 9.

As shown in FIG. 10, input ports I1, I2, I3, I4, I5, and I6 are formed in the body upper portion 47A. The pattern switching lever 46 can be manipulated in the leftward direction which is shown by arrow A1 in the figure and in the rightward direction which is opposite to the leftward direction and is shown by arrow A2 in the figure. If the pattern switching lever 46 is manipulated in the A1 direction, the relative rotation position of piston 48 with respect to the body 47 is changed and switched to the switching position of the first operation pattern S1 shown in FIG. 6. Furthermore, if the pattern switching lever 46 is manipulated in the A2 direction, the relative rotation position of the piston 48 with respect to the body 47 is changed and switched to the switching positions of the second operation pattern S2 and third operation pattern S3 shown in FIG. 6.

Figure 11:
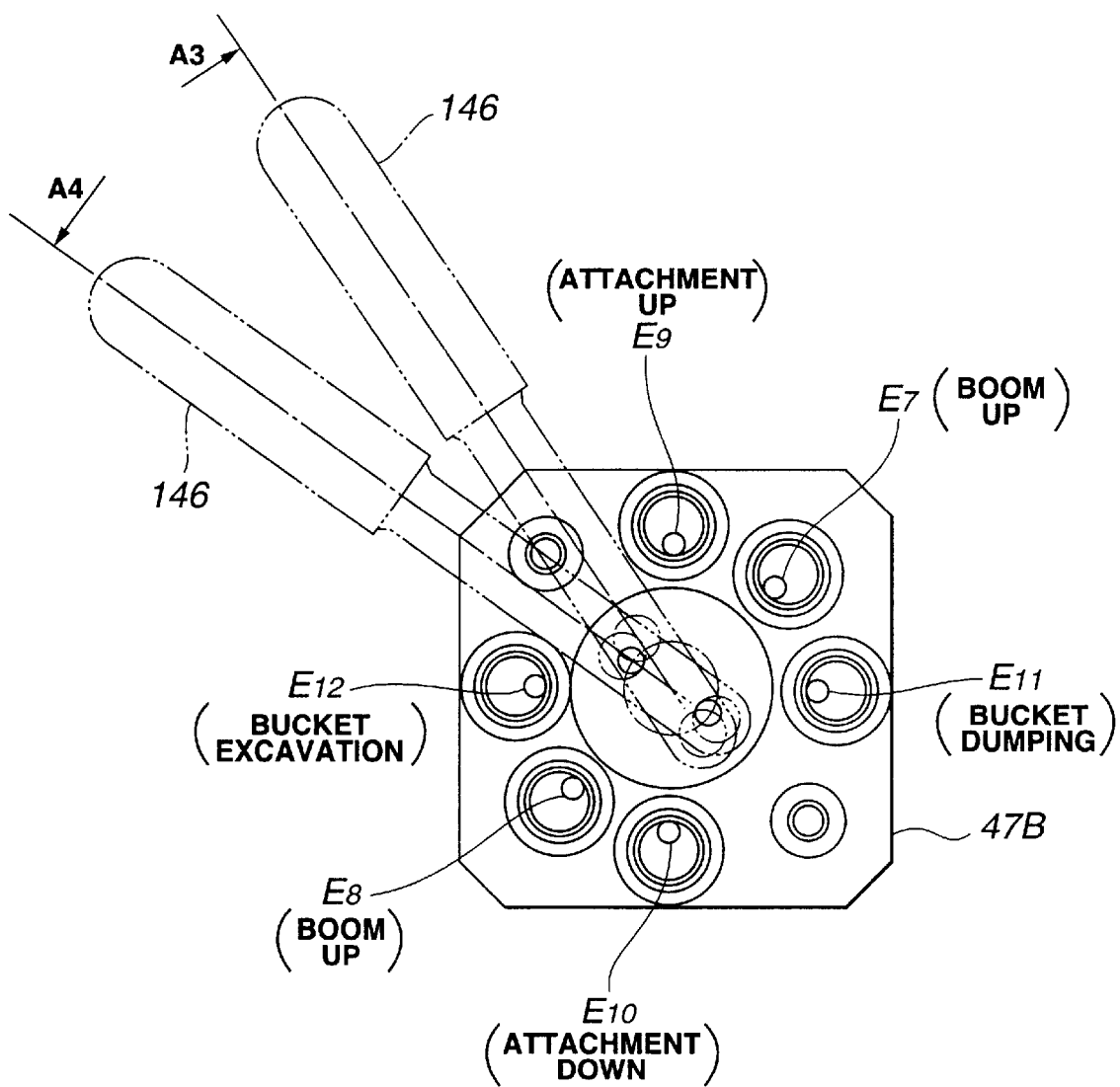
FIG. 11 is a bottom view corresponding to the top surface view shown in FIG. 10; it is represented by a triangular method with respect to FIG. 10.

FIG. 11 is a bottom view corresponding to the top view shown in FIG. 10; the representation is made by a triangular method according to FIG. 10.

As shown in FIG. 11, the output ports E7, E8, E9, E10, E11, and E12 are formed in the body lower part 47B. The pattern switching lever 146 can be manipulated in the rightward direction which is shown by arrow A3 in the figure and in the leftward direction which is opposite to the rightward direction and is shown by arrow A4 in the figure. If the pattern switching lever 146 is manipulated in the A3 direction, the relative rotation position of piston 148 with respect to the body 47 is changed and switched to the switching positions of the first operation pattern S1 and second operation pattern S2 shown in FIG. 7. Furthermore, if the pattern switching lever 146 is manipulated in the A4 direction, the relative rotation position of piston 148 with respect to the body 47 is changed and switched to the switching position of the third operation pattern S3 shown in FIG. 7.

Figure 12:
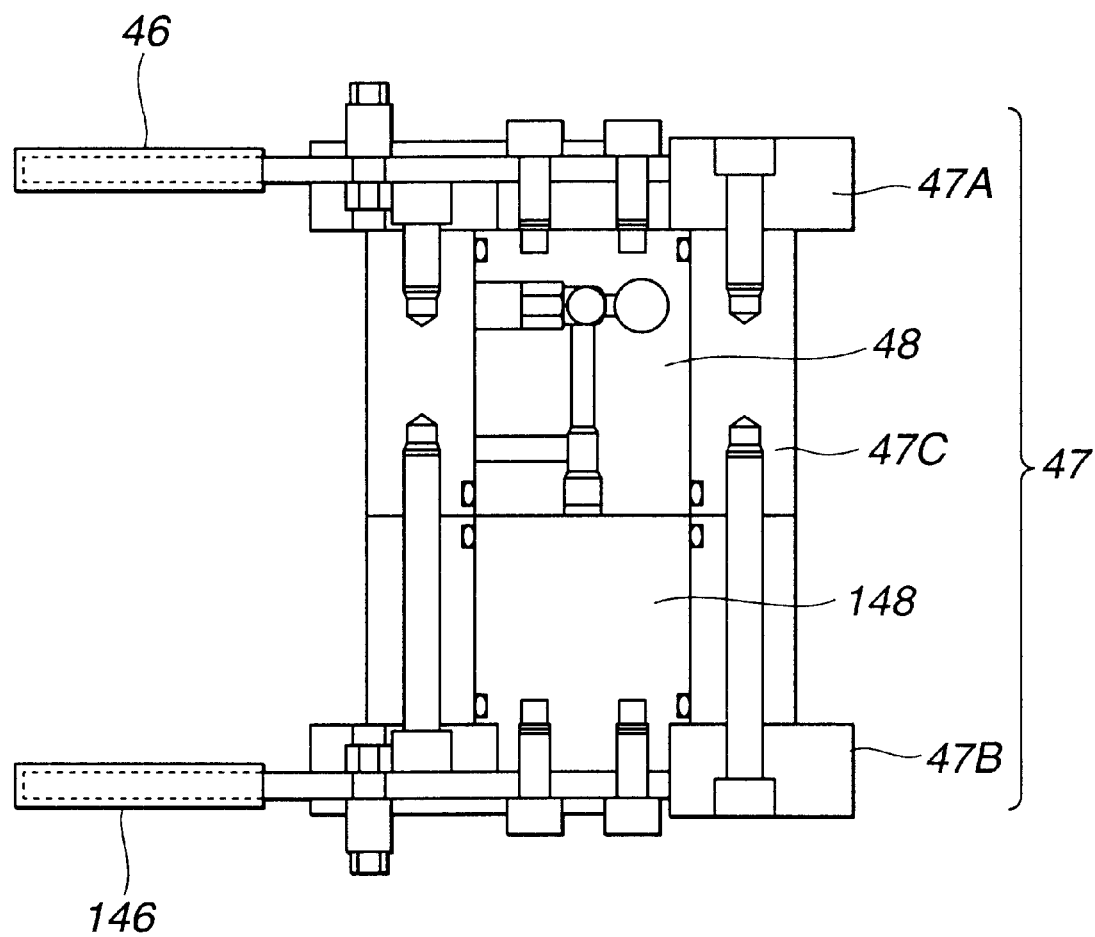
FIG. 12 is a cross sectional view illustrating the H—H section in FIG. 10.

FIG. 12 is a cross-sectional view along H—H in FIG. 10.

As shown in FIG. 12, the body upper portion 47A, body central portion 47C, and body lower portion 47B are joined to each other with bolts. The pattern switching lever 46 is secured to the piston 48 with bolts. The bridge circuit 45 in which four shuttle valves 41, 42, 43, 44 are connected in a circular fashion is provided inside the piston 48. The pattern switching lever 146 is secured to the piston 148 with bolts.

Figure 13:
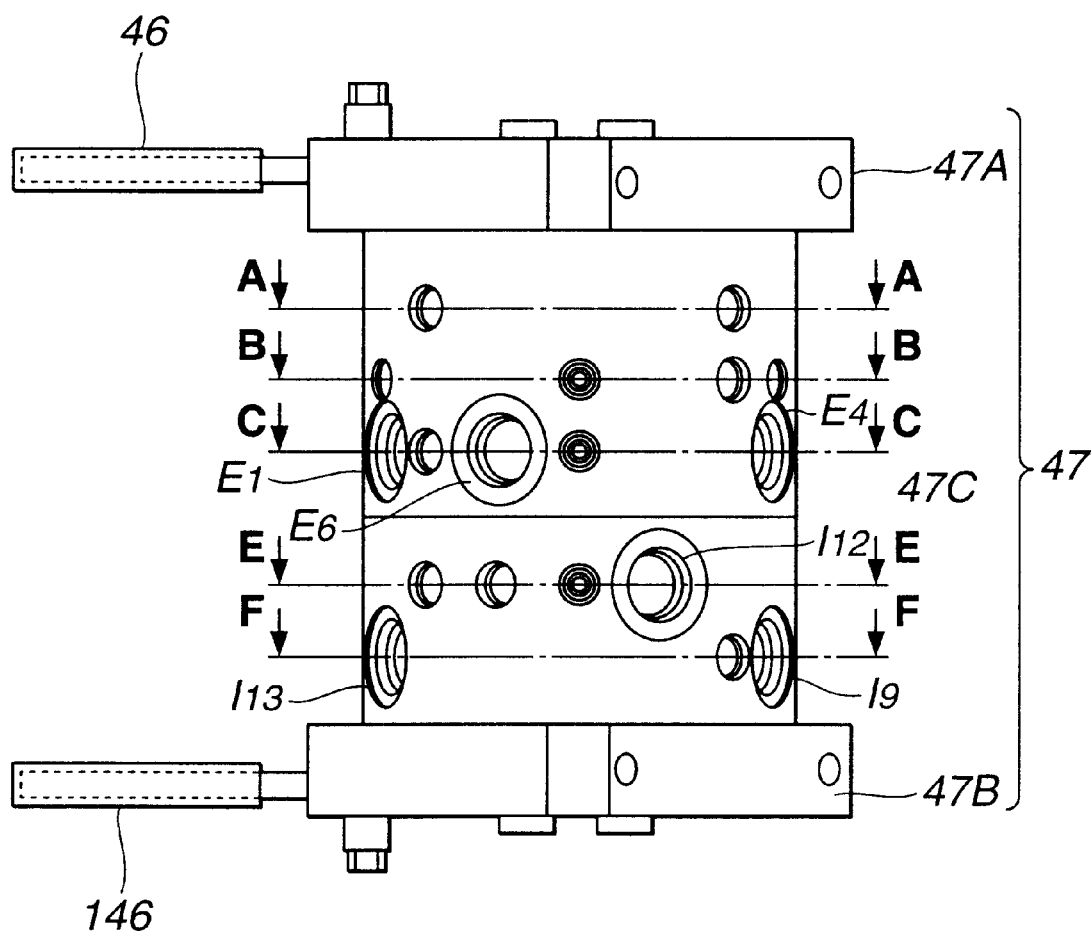
FIG. 13 is a side view of the pattern switching valve shown in FIG. 9.

FIG. 13 is a side view of pattern switching valves 40, 140 shown in FIG. 9. This view is taken from the same direction as the view in FIG. 12. Input ports I9, I10, I11, I12, I13, I14 and output ports E1, E2, E3, E4, E5, E6 are formed in the body central portion 47C of body 47.

Figure 14C:
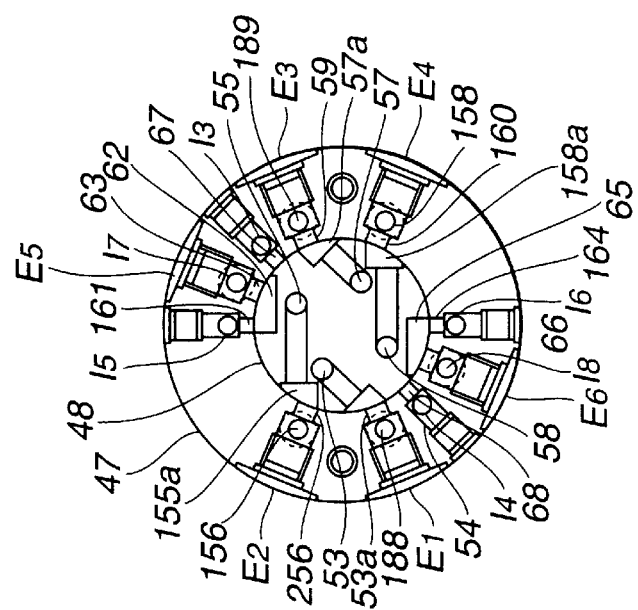
FIGS. 14(a), 14(b) and 14(c) respectively illustrate A cross section, B cross section, and C cross section in FIG. 13; those figures illustrate the state relating to switching to the first operation pattern.
Figure 14B:
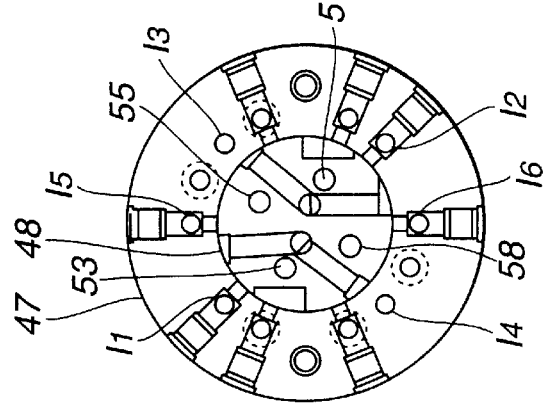
Figure 14A:
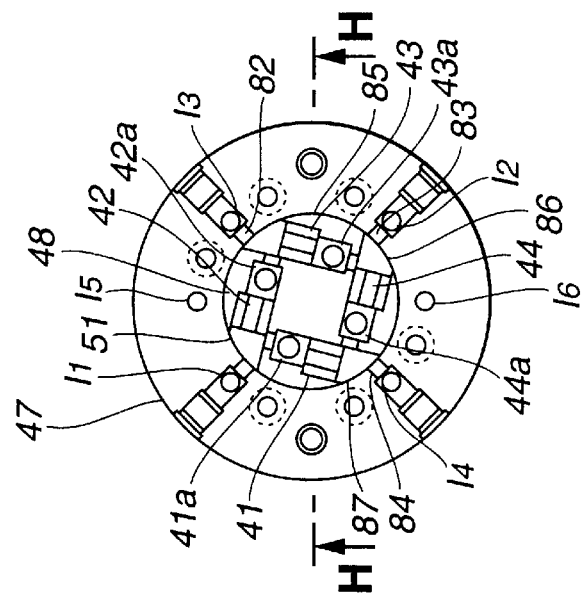

FIG. 14(a) is a cross-sectional view along A—A in FIG. 13. FIG. 14(b) is a cross-sectional view along B—B in FIG. 13. FIG. 14(c) is a cross-sectional view along C—C in FIG. 13. FIGS. 14(a) to 14(c) are cross-sectional views relating to a state in which switching was made to the first operation pattern S1.

Likewise, FIG. 15(a) is a cross-sectional view along A—A in FIG. 13. FIG. 15(b) is a cross-sectional view along B—B in FIG. 13. FIG. 15(c) is a cross-sectional view along C—C in FIG. 13. FIGS. 15(a) to 15(c) are cross-sectional views relating to a state in which switching has been made to the second operation pattern S2 and third operation pattern S3.

As shown in FIG. 14(a), in the A—A cross section, input ports I1, I2, I3, I4 are linked to the outer wall surface of piston 48 via the passages 50, 83, 82, 84, respectively. Furthermore, the inlet opening 51 of shuttle valves 41, 42, inlet opening 85 of shuttle valves 42, 43, inlet opening 86 of shuttle valves 43, 44, and inlet opening 87 of shuttle valves 44, 41 are formed at the outer wall surface of piston 48.

The shuttle valve 41 is configured in such a manner as to operate so as to release the higher-pressure hydraulic fluid among the hydraulic fluids applied under pressure to both ends of ball 41a. Other shuttle valves 42, 43, 44 have a similar configuration.

An outlet opening 53 of shuttle valve 41 is formed in the lower surface of ball 41a of shuttle valve 41 (see FIG. 14(b)). The outlet opening 53 is formed downward from the lower surface of ball 41a to the position reaching the C section of body central portion 47C (see FIG. 14(c)). Hydraulic fluid under pressure is released to the outlet opening 53 following the actuation of ball 41a. Outlet openings 55, 57, 58 are similarly formed in the lower surface of balls 42a, 43a, 44a of other shuttle valves 42, 43, 44.

The configuration of the B—B section will be described below with reference to FIG. 15(b).

As shown in FIG. 15(b), in the B—B section, the input port I1 and passage 156 which are adjacent in the tangential direction of body 47 are linked to the outer wall surface of piston 48 via passages 90, 56. On the other hand, a notch 55a having a width such as to link the input port I1 and passage 156 together is formed at the outer wall surface of piston 48. Likewise, the input port I2 and passage 158 which are adjacent in the tangential direction of body 47 are linked to the outer wall surface of piston 48 via passages 81, 60. On the other hand, a notch 58a having a width such as to link the input port I2 and passage 158 together is formed at the outer wall surface of piston 48.

Furthermore, the input port I5 and passage 188 located at the body 47 side are linked to the outer wall surface of piston 48 via passages 61, 188a. On the other hand, a passage 88 having a shape such as to link the input port I5 and passage 188 together is formed in the piston 48.

Likewise, the input port I6 and passage 189 located at the body 47 side are linked to the outer wall surface of piston 48 via passages 64, 189a. On the other hand, a passage 89 having a shape such as to link the input port I6 and passage 189 together is formed in the piston 48.

The configuration of the C—C section will be described below with reference to FIG. 14(c).

As shown in FIG. 14(c), the input port I5, input port I7, and input port I3 which are adjacent to each other at the body 47 side are linked to the outer wall surface of piston 48 via passages 161, 63, 67. A notch 62 having a width such as to link together the adjacent input port I5 and input port I7 or the adjacent input port I7 and input port I3 is formed at the outer wall surface of piston 48. The input port I7 is linked to the output port E5.

Likewise, the input port I6, input port I8, and input port I4 which are adjacent to each other at the body 47 side are linked to the outer wall surface of piston 48 via passages 164, 66, 68.

A notch 65 having a width such as to link together the adjacent input port I6 and input port I8 or the adjacent input port I8 and input port I4 together is at the outer wall surface of piston 48. The input port I8 is linked to the output port E6.

Furthermore, the output port E1 located at the body 47 side is linked to a passage 188. The output port E1 is linked to the outer wall surface of piston 48 via a passage 54. On the other hand, a notch 53a linked to the passage 54 is formed in the opposite position at the outer wall surface of piston 48. The notch 53a is linked to the outlet opening 53 of shuttle valve 41.

Likewise, the output port E3 located at the body 47 side is linked to a passage 189. The output port E3 is linked to the outer wall surface of piston 48 via a passage 59. On the other hand, a notch 57a linked to the passage 59 is formed in the opposite position at the outer wall surface of piston 48. The notch 57a is linked to the outlet opening 57 of shuttle valve 43.

Likewise, the output port E2 located at the body 47 side is linked to a passage 156. The output port E2 is linked to the outer wall surface of piston 48 via a passage 256. On the other hand, a notch 155a linked to the passage 256 is formed in the opposite position at the outer wall surface of piston 48. The notch 155a is linked to the outlet opening 55 of shuttle valve 42.

Likewise, the output port E4 located at the body 47 side is linked to a passage 158. The output port E4 is linked to the outer wall surface of piston 48 via a passage 160. On the other hand, a notch 158a linked to the passage 160 is formed in the opposite position at the outer wall surface of piston 48. The notch 158a is linked to the outlet opening 58 of shuttle valve 44.

Figure 16B:
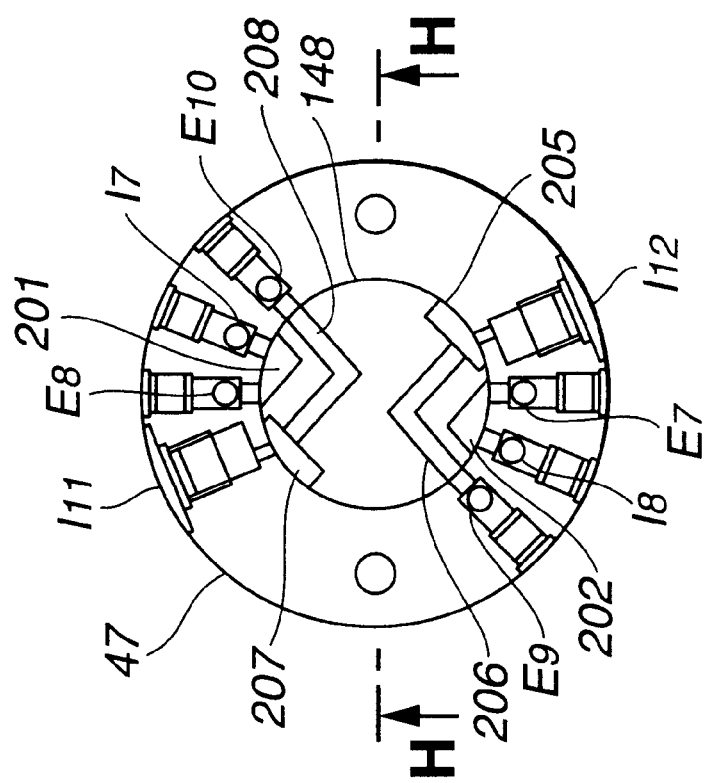
FIGS. 16(a) and 16(b) respectively illustrate E cross section and F cross section in FIG. 13; those figures illustrate the state relating to switching to the first and second operation patterns.
Figure 16A:
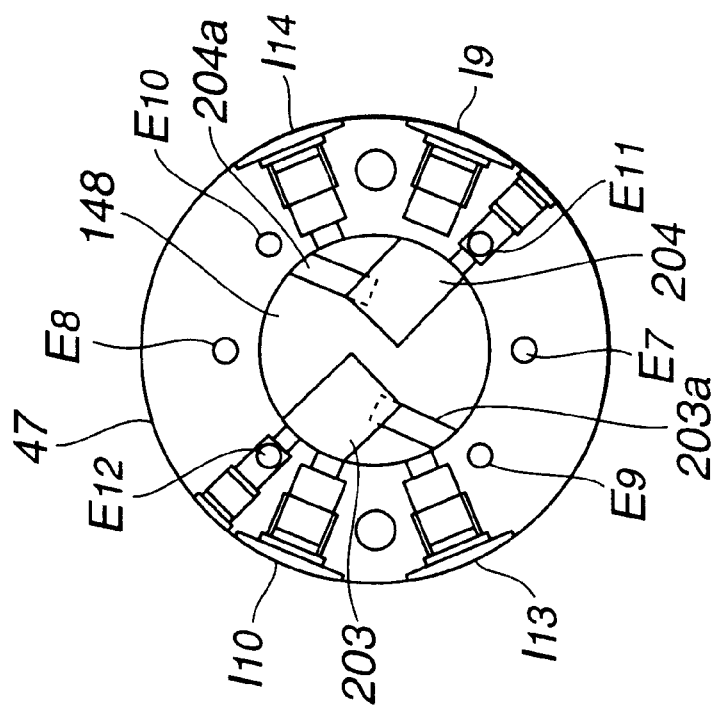

(a) is a cross-sectional view along E—E in FIG. 13. FIG. 16(b) is a cross-sectional view along F—F in FIG. 13. FIGS. 16(a) and 16(b) are cross-sectional views relating to a state in which switching was made to the first operation pattern S1 and second operation pattern S2.

Figure 17B:
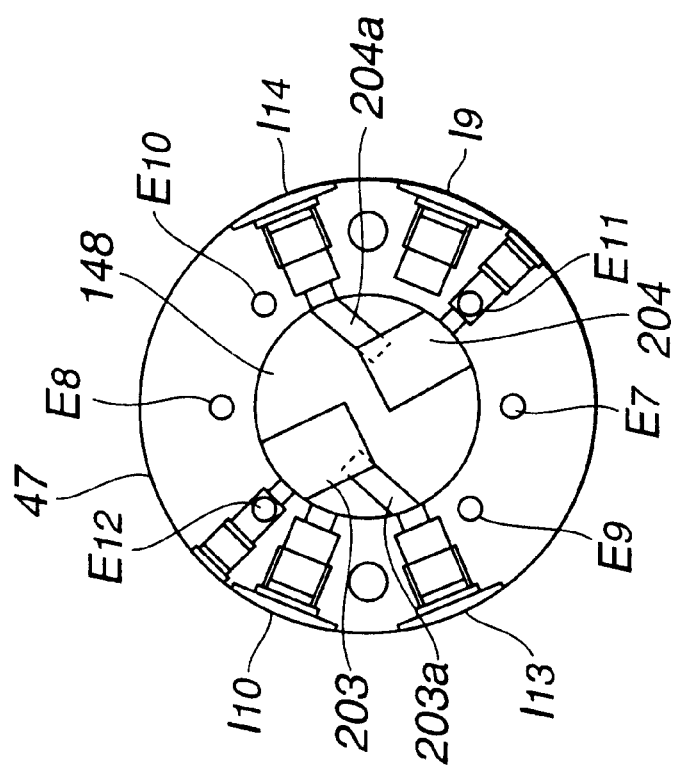
FIGS. 17(a) and 17(b) respectively illustrate E cross section and F cross section in FIG. 13; those figures illustrate the state relating to switching to the third operation pattern.
Figure 17A:
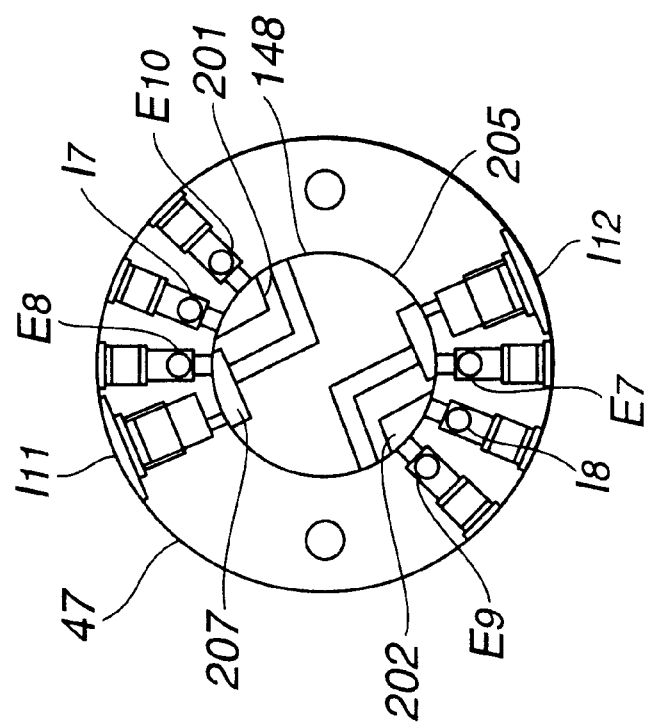

Likewise, FIG. 17(a) is a cross-sectional view along E—E in FIG. 13. FIG. 17(b) is a cross-sectional view along F—F in FIG. 13. FIGS. 17(a) and 17(b) are cross-sectional views relating to a state in which switching was made to the third operation pattern S3.

As shown in FIG. 16(a) and FIG. 17(a), in the E—E section, a notch 201 having a width such as to link together the output port E8 and input port I7 which are adjacent to each other at the body 47 side or the input port I7 and output port E10 which are adjacent to each other at the body 47 side is formed at the outer wall surface of piston 148.

Likewise, a notch 202 having a width such as to link together the output port E7 and input port I8 which are adjacent to each other at the body 47 side or the input port I8 and output port E9 which are adjacent to each other at the body 47 side is formed at the outer wall surface of piston 148.

Furthermore, a notch 205 having a width such as to link together the input port I12 and output port E7 which are adjacent to each other at the body 47 side is formed at the outer wall surface of piston 148. A passage 206 shaped so as to be linked to the notch 205 and also to be linked to the output port E9 at the body 47 side is formed in the piston 148.

Likewise, a notch 207 having a width such as to link together the input port I11 and output port E8 which are adjacent to each other at the body 47 side is formed at the outer wall surface of piston 148. A passage 208 shaped so as to be linked to the notch 207 and also to be linked to the output port E10 at the body 47 side is formed in the piston 148.

The configuration of the F—F section will be described below with reference to FIGS. 16(b), 17(b).

A notch 203 having a width such as to link together the input port I0 and output port E12 which are adjacent to each other at the body 47 side is formed at the outer wall surface of piston 148. A passage 203a shaped so as to be linked to the notch 203 and also to be linked to the input port I13 at the body 47 side is formed in the piston 148.

Likewise, a notch 204 having a width such as to link together the input port I9 and output port E11 which are adjacent to each other at the body 47 side is formed at the outer wall surface of piston 148. A passage 204a shaped so as to be linked to the notch 204 and also to be linked to the input port I14 at the body 47 side is formed in the piston 148.

Manipulation of the above-described pattern switching valves 40, 140 will be described below.

If the pattern switching lever 46 is manipulated in the A1 direction, the relative rotation position of piston 48 with respect to the body 47 is changed and switched to the switching position of the first operation pattern S1 shown in FIGS. 14(a) to 14(c). If the pattern switching lever 146 is manipulated at the same time in the A3 direction, the relative rotation position of the piston 148 with respect to the body 47 is changed and switched to the switching position of the first operation pattern S1 shown in FIGS. 16(a) and 16(b).

If at this time the left control lever 6L is manipulated in the forward direction, the pilot hydraulic fluid that has been output under pressure from the pilot passage 11 flows into the input port I1 of pattern switching valve 40. Therefore, the pilot hydraulic fluid flows into the inlet opening 51 of shuttle valves 41, 42 at the piston 48 side via the passage 50 at the body 47 side. Furthermore, the ball 42a of shuttle valve 42 is actuated. Therefore, the pilot hydraulic fluid flows out to the outlet openings 53, 55 of shuttle valves 41, 42 (see FIGS. 14(a) and 14(b)).

The pilot hydraulic fluid that has flowed out to the outlet opening 53 of shuttle valve 41 flows into the passage 54 at the body 47 side via the notch 53a at the piston 48 side. Therefore, the pilot hydraulic fluid passes through the passage 54 and flows out from the output port E1. Furthermore, the pilot hydraulic fluid that has flowed out to the outlet opening 55 of shuttle valve 42 flows into the passage 256 at the body 47 side via the notch 155a at the piston 48 side. Therefore, the pilot hydraulic fluid passes through the passage 256 and flows out from the output port E2 (see FIG. 14(c)).

The pilot hydraulic fluid that has flowed out of the output ports E1, E2 of pattern switching valve 40 is supplied to the forward movement side pilot ports 32F, 31F of the left and right traveling body control valves 31, 32, respectively. As a result, the left and right traveling bodies 36, 38 are actuated in the forward movement direction F at the same speed and the vehicle advances forward (straight forward).

Furthermore, if the left control lever 6L is manipulated in the rearward direction, the pilot hydraulic fluid that has been output from the pilot passage 12 flows into the input port I2 of pattern switching valve 40. Therefore, the pilot hydraulic fluid flows into the inlet opening 86 of shuttle valves 43, 44 at the piston 48 side via the passage 83 at the body 47 side. As a result, the balls 43a, 44a of shuttle valves 43, 44 are actuated in the same manner. Therefore, the pilot hydraulic fluid flows out into the outlet openings 57, 58 of shuttle valves 43, 44 (see FIG. 14(a), (b)).

The pilot hydraulic fluid that has flowed out to the outlet opening 57 of shuttle valve 43 flows into the passage 59 at the body 47 side via the notch 57a at the piston 48 side. Therefore, the pilot hydraulic fluid passes through the passage 59 and flows out from the output port E3. Furthermore, the pilot hydraulic fluid that has flowed out into the outlet opening 58 of shuttle valve 44 flows into the passage 160 at the body 47 side via the notch 158a at the piston 48 side. Therefore, the pilot hydraulic fluid passes through the passage 160 and flows out from the output port E4 (see FIG. 14(c)).

The pilot hydraulic fluid that has flowed out from the output ports E3, E4 of pattern switching valve 40 is respectively supplied to the rearward movement side pilot ports 32R, 31R of the left and right traveling body control valves 31, 32. As a result, the left and right traveling bodies 36, 38 are actuated at the same speed in the rearward movement direction R and the vehicles moves rearward (straight movement).

If the left control lever 6L is manipulated in the rightward direction, the pilot hydraulic fluid that has been output from the pilot passage 13 flows into the input port I3 of pattern switching valve 40. Therefore, the pilot hydraulic fluid flows into the inlet opening 85 of shuttle valves 42, 43 at the piston 48 side via the passage 82 at the body 47 side. As a result, the balls 42a, 43a of shuttle valves 42, 43 are actuated in the same manner. Therefore, the pilot hydraulic fluid flows out into the outlet openings 55, 57 of shuttle valves 43, 44 (see FIGS. 14(a) and 14(b)).

The pilot hydraulic fluid that has flowed out to the outlet opening 55 of shuttle valve 42 flows into the passage 256 at the body 47 side via the notch 155a at the piston 48 side. Therefore, the pilot hydraulic fluid passes through the passage 256 and flows out from the output port E2. Furthermore, the pilot hydraulic fluid that has flowed out into the outlet opening 57 of shuttle valve 43 flows into the passage 59 at the body 47 side via the notch 57a at the piston 48 side. Therefore, the pilot hydraulic fluid passes through the passage 59 and flows out from the output port E3 (see FIG. 14(c)).

The pilot hydraulic fluid that has flowed out from the output ports E2, E3 of pattern switching valve 40 is respectively supplied to the forward movement side pilot port 31F of the left traveling body control valve 31 and the rearward movement side pilot port 32R of the right traveling body control valve 32. As a result, the left and right traveling bodies 36, 38 are actuated at the same speed in the forward movement direction F and rearward movement direction R, respectively, and the vehicle turns to the right (right spin turn).

If the left control lever 6L is manipulated in the leftward direction, the pilot hydraulic fluid that has been output from the pilot passage 14 flows into the input port I4 of pattern switching valve 40. Therefore, the pilot hydraulic fluid flows into the inlet opening 87 of shuttle valves 44, 41 at the piston 48 side via the passage 84 at the body 47 side. As a result, the balls 44a, 41a of shuttle valves 44, 41 are actuated in the same manner. Therefore, the pilot hydraulic fluid flows out into the outlet openings 58, 53 of shuttle valves 44, 41 (see FIGS. 14(a) and 14(b)).

The pilot hydraulic fluid that has flowed out to the outlet opening 58 of shuttle valve 44 flows into the passage 160 at the body 47 side via the notch 158a at the piston 48 side. Therefore, the pilot hydraulic fluid passes through the passage 160 and flows out from the output port E4. Furthermore, the pilot hydraulic fluid that has flowed out into the outlet opening 53 of shuttle valve 41 flows into the passage 54 at the body 47 side via the notch 53a at the piston 48 side. Therefore, the pilot hydraulic fluid passes through the passage 54 and flows out from the output port E1 (see FIG. 14(c)).

The pilot hydraulic fluid that has flowed out from the output ports E4, E1 of pattern switching valve 40 is respectively supplied to the rearward movement side pilot port 31R of the left traveling body control valve 31 and the forward movement side pilot port 32F of the right traveling body control valve 32. As a result, the left and right traveling bodies 36, 38 are actuated at the same speed in the rearward movement direction R and forward movement direction F, respectively, and the vehicle turns to the left (left spin turn).

On the other hand, if the right control lever 6R is manipulated in the forward direction, the pilot hydraulic fluid that has been output from the pilot passage 15 flows into the input port I5 of pattern switching valve 40. Therefore, the pilot hydraulic fluid flows into the passage 63 at the body 47 side via the passage 161 at the body 47 side and the notch 62 at the piston 48 side. Therefore, the pilot hydraulic fluid passes through the passage 63 and is output from the output port E5 and input to the input port I7 of switching valve 140 (see FIG. 14(c)).

As shown in FIGS. 16(a) and 16(b), the pilot hydraulic fluid that has been input to the input port I7 flows out from the output port E8 of switching valve 140 via the notch 201 at the piston 148 side (see FIG. 16(a)).

The pilot hydraulic fluid that has flowed out from the output port E8 of pattern switching valve 140 is supplied to the boom-down pilot port 72a of boom control valve 72. As a result, the boom is actuated downward.

Furthermore, if the right control lever 6R is manipulated in the rearward direction, the pilot hydraulic fluid that has been output from the pilot passage 16 flows into the input port I6 of pattern switching valve 40. Therefore, the pilot hydraulic fluid flows into the passage 66 at the body 47 side via the passage 164 at the body 47 side and the notch 65 at the piston 48 side. Therefore, the pilot hydraulic fluid passes through the passage 66 and is output from the output port E6 and input to the input port I8 of switching valve 140 (see FIG. 14(c)).

As shown in FIGS. 16(a) and 16(b), the pilot hydraulic fluid that has been input to the input port I8 flows out from the output port E7 of switching valve 140 via the notch 202 at the piston 148 side (see FIG. 16(a)).

The pilot hydraulic fluid that has flowed out from the output port E7 of pattern switching valve 140 is supplied to the boom-up side pilot port 72b of boom control valve 72. As a result, the boom is actuated upward.

Furthermore, if the right control lever 6R is manipulated in the rightward direction, the pilot hydraulic fluid that has been output from the pilot passage 17 flows into the input port I9 of pattern switching valve 140. As shown in FIGS. 16(a) and 16(b), the pilot hydraulic fluid that has been input to the input port I9 flows out from the output port E11 of switching valve 140 via the notch 204 at the piston 148 side (see FIG. 16(b)).

The pilot hydraulic fluid that has flowed out from the output port E11 of pattern switching valve 140 is supplied to the bucket-dumping side pilot port 73a of bucket control valve 73. As a result, the bucket is actuated to the dumping side.

Furthermore, if the right control lever 6R is manipulated in the leftward direction, the pilot hydraulic fluid that has been output from the pilot passage 18 flows into the input port I10 of pattern switching valve 140.

As shown in FIGS. 16(a) and 16(b), the pilot hydraulic fluid that has been input to the input port I10 flows out from the output port E12 of switching valve 140 via the notch 203 at the piston 148 side (see FIG. 16(b)).

The pilot hydraulic fluid that has flowed out from the output port E12 of pattern switching valve 140 is supplied to the bucket-excavation side pilot port 73b of bucket control valve 73. As a result, the bucket is actuated to the excavation side.

In case an attachment is installed, the following motion is executed.

Thus, if the left pedal 16L is foot manipulated at the front side, the pilot hydraulic fluid that has been output from the pilot passage 111 flows into the input port I12 of pattern switching valve 140.

As shown in FIGS. 16(a) and 16(b), the pilot hydraulic fluid that has been input into the input port I12 flows out from the output port E9 of switching valve 140 via the notch 205 at the piston 148 side and the passage 206 (see FIG. 16(a)).

The pilot hydraulic fluid that has flowed out from the output port E9 of pattern switching valve 140 is supplied to the attachment-up side pilot port 172b of attachment control valve 172. As a result, the attachment is actuated upward.

Furthermore, if the left pedal 16L is foot manipulated at the rear side, the pilot hydraulic fluid that has been output from the pilot passage 112 flows into the input port I11 of pattern switching valve 140.

As shown in FIGS. 16(a) and 16(b), the pilot hydraulic fluid that has been input into the input port I11 flows out from the output port E10 of switching valve 140 via the notch 207 at the piston 148 side and the passage 208 (see FIG. 16(a)).

The pilot hydraulic fluid that has flowed out from the output port E10 of pattern switching valve 140 is supplied to the attachment-down side pilot port 172a of attachment control valve 172. As a result, the attachment is actuated downward.

The motion executed when the pattern switching lever 46 is manipulated in the A2 direction and the pattern switching lever 146 is manipulated in the A3 direction will be described below.

If the pattern switching lever 46 is manipulated in the A2 direction, the relative rotation position of piston 48 with respect to body 47 is changed and switched to the switching position of the second operation pattern S2 shown in FIGS. 15(a) to 15(c). If the pattern switching lever 146 is manipulated in the A3 direction, the relative rotation position of piston 148 with respect to body 47 is changed and switched to the switching position of the second operation pattern S2 shown in FIGS. 16(a) and 16(b).

At this time, as shown in FIG. 15(a), the input ports I1~I4 of pattern switching valve 40 assume positions which are not linked to shuttle valves 41~44.

If the left control lever 6L is manipulated in the forward direction, the pilot hydraulic fluid that has been output from the pilot passage 11 flows into the input port I1 of pattern switching valve 40. Therefore, the pilot hydraulic fluid flows into the passage 56 at the body 47 side via the passage 90 at the body 47 side and the notch 55a at the piston 48 side. The pilot hydraulic fluid that has flowed into the passage 56 passes through the passage 156 and flows out from the output port E2 (see FIGS. 15(b) and 15(c)).

The pilot hydraulic fluid that has flowed out from the output port E2 of pattern switching valve 40 acts upon the forward movement side pilot port 31F of the left traveling body control valve 31. As a result, the left traveling body 36 is actuated in the forward movement direction F and the vehicle advances forward and to the left.

If the left control lever 6L is manipulated in the rearward direction, the pilot hydraulic fluid that has been output from the pilot passage 12 flows into the input port I2 of pattern switching valve 40. Therefore, the pilot hydraulic fluid flows into the passage 60 at the body 47 side via the passage 81 at the body 47 side and the notch 58a at the piston 48 side. The pilot hydraulic fluid that has flowed into the passage 60 passes through the passage 158 and flows out from the output port E4 (see FIGS. 15(b) and 15(c)).

The pilot hydraulic fluid that has flowed out from the output port E4 of pattern switching valve 40 acts upon the rearward movement side pilot port 31R of the left traveling body control valve 31. As a result, the left traveling body 36 is actuated in the rearward movement direction R and the vehicle moves rearward and to the left.

If the left control lever 6L is manipulated in the rightward direction, the pilot hydraulic fluid that has been output from the pilot passage 13 flows into the input port I3 of pattern switching valve 40. Therefore, the pilot hydraulic fluid flows into the passage 63 at the body 47 side via the passage 67 at the body 47 side and the notch 62 at the piston 48 side. The pilot hydraulic fluid that has flowed into the passage 63 is output from the output port E5 and input into the input port I7 of switching valve 140 (see FIG. 15(c)).

As shown in FIGS. 16(a) and 16(b), the pilot hydraulic fluid that has been input to the input port I7 flows out from the output port E8 of switching valve 140 via the notch 201 at the piston 148 side (see FIG. 16(a)).

The pilot hydraulic fluid that has flowed out from the output port E8 of pattern switching valve 140 is supplied to the boom-down pilot port 72a of boom control valve 72. As a result, the boom is actuated downward.

If the left control lever 6L is manipulated in the leftward direction, the pilot hydraulic fluid that has been output from the pilot passage 14 flows into the input port 14 of pattern switching valve 40. Therefore, the pilot hydraulic fluid flows into the passage 66 at the body 47 side via the passage 68 at the body 47 side and the notch 65 at the piston 48 side. The pilot hydraulic fluid that has flowed into the passage 66 is output from the output port E6 and input into the input port I8 of switching valve 140 (see FIG. 15(c)).

As shown in FIGS. 16(a) and 16(b), the pilot hydraulic fluid that has been input to the input port I8 flows out from the output port E7 of switching valve 140 via the notch 202 at the piston 148 side (see FIG. 16(a)).

The pilot hydraulic fluid that has flowed out from the output port E7 of pattern switching valve 140 is supplied to the boom-up side pilot port 72b of boom control valve 72. As a result, the boom is actuated upward.

If the right control lever 6R is manipulated in the forward direction, the pilot hydraulic fluid that has been output from the pilot passage 15 flows into the input port I5 of pattern switching valve 40. Therefore, the pilot hydraulic fluid flows into the passage 188a at the body 47 side via the passage 61 at the body 47 side and the passage 88 at the piston 48 side. The pilot hydraulic fluid that has flowed into the passage 188a passes through the passage 188 and flows out from the output port E1 (see FIGS. 15(b) and 15(c)).

The pilot hydraulic fluid that has flowed out from the output port E1 of pattern switching valve 40 acts upon the forward movement side pilot port 32F of the right traveling body control valve 32. As a result, the right traveling body 38 is actuated in the forward movement direction F and the vehicle advances forward and to the right.

If the right control lever 6R is manipulated in the rearward direction, the pilot hydraulic fluid that has been output from the pilot passage 16 flows into the input port I6 of pattern switching valve 40. Therefore, the pilot hydraulic fluid flows into the passage 189a at the body 47 side via the passage 64 at the body 47 side and the passage 89 at the piston 48 side. The pilot hydraulic fluid that has flowed into the passage 189a passes through the passage 189 and flows out from the output port E3 (see FIGS. 15(b) and 15(c)).

The pilot hydraulic fluid that has flowed out from the output port E3 of pattern switching valve 40 acts upon the rearward movement side pilot port 32R of the right traveling body control valve 32. As a result, the right traveling body 38 is actuated in the rearward movement direction R and the vehicle moves rearward and to the right.

The motion executed when the right control lever 6R is manipulated in the rightward and leftward directions is identical to the motion that has already been explained with reference to FIGS. 16(a) and 16(b) and the explanation thereof is therefore omitted.

The motion executed when the left pedal 16L is foot manipulated at the front and rear side in case an attachment has been installed is identical to the motion that has already been explained with reference to FIGS. 16(a) and 16(b) and the explanation thereof is therefore omitted.

The motion executed when the pattern switching lever 46 is manipulated in the A2 direction and the pattern switching lever 146 is manipulated in the A4 direction will be described below.

If the pattern switching lever 46 is manipulated in the A2 direction, the relative rotation position of piston 48 with respect to body 47 is changed and switched to the switching position of the third operation pattern S3 shown in FIGS. 15(a) to 15(c). If the pattern switching lever 146 is manipulated in the A4 direction, the relative rotation position of piston 148 with respect to body 47 is changed and switched to the switching position of the third operation pattern S3 shown in FIGS. 17(a) and 17(b).

At this time, as shown in FIG. 15(a), the input ports I1~I4 of pattern switching valve 40 assume positions which are not linked to shuttle valves 41~44.

If the left control lever 6L is manipulated in the forward direction, the pilot hydraulic fluid that has been output from the pilot passage 11 flows into the input port I1 of pattern switching valve 40. Therefore, the pilot hydraulic fluid flows into the passage 56 at the body 47 side via the passage 90 at the body 47 side and the notch 55a at the piston 48 side. The pilot hydraulic fluid that has flowed into the passage 56 passes through the passage 156 and flows out from the output port E2 (see FIGS. 15(b) and 15(c)).

The pilot hydraulic fluid that has flowed out from the output port E2 of pattern switching valve 40 acts upon the forward movement side pilot port 31F of the left traveling body control valve 31. As a result, the left traveling body 36 is actuated in the forward movement direction F and the vehicle advances forward and to the left.

Furthermore, if the left control lever 6L is manipulated in the rearward direction, the pilot hydraulic fluid that has been output from the pilot passage 12 flows into the input port I2 of pattern switching valve 40. Therefore, the pilot hydraulic fluid flows into the passage 60 at the body 47 side via the passage 81 at the body 47 side and the notch 58a at the piston 48 side. The pilot hydraulic fluid that has flowed into the passage 60 passes through the passage 158 and flows out from the output port E4 (see FIGS. 15(b) and 15(c)).

The pilot hydraulic fluid that has flowed out from the output port E4 of pattern switching valve 40 acts upon the rearward movement side pilot port 31R of the left traveling body control valve 31. As a result, the left traveling body 36 is actuated in the rearward movement direction R and the vehicle moves rearward and to the left.

If the right control lever 6R is manipulated in the forward direction, the pilot hydraulic fluid that has been output from the pilot passage 15 flows into the input port I5 of pattern switching valve 40. Therefore, the pilot hydraulic fluid flows into the passage 188a at the body 47 side via the passage 61 at the body 47 side and the passage 88 at the piston 48 side. The pilot hydraulic fluid that has flowed into the passage 188a passes through the passage 188 and flows out from the output port E1 (see FIGS. 15(b) and 15(c)).

The pilot hydraulic fluid that has flowed out from the output port E1 of pattern switching valve 40 acts upon the forward movement side pilot port 32F of the right traveling body control valve 32. As a result, the right traveling body 38 is actuated in the forward movement direction F and the vehicle advances forward and to the right.

Furthermore, if the right control lever 6R is manipulated in the rearward direction, the pilot hydraulic fluid that has been output from the pilot passage 16 flows into the input port I6 of pattern switching valve 40. Therefore, the pilot hydraulic fluid flows into the passage 189a at the body 47 side via the passage 64 at the body 47 side and the passage 89 at the piston 48 side. The pilot hydraulic fluid that has flowed into the passage 189a passes through the passage 189 and flows out from the output port E3 (see FIGS. 15(b) and 15(c)).

The pilot hydraulic fluid that has flowed out from the output port E3 of pattern switching valve 40 acts upon the rearward movement side pilot port 32R of the right traveling body control valve 32. As a result, the right traveling body 38 is actuated in the rearward movement direction R and the vehicle moves rearward and to the right.

Moreover, if the left pedal 16L is foot manipulated at the front side, the pilot hydraulic fluid that has been output from the pilot passage 111 flows into the input port I12 of pattern switching valve 140.

As shown in FIGS. 17(a) and 17(b), the pilot hydraulic fluid that has been input into the input port I12 flows out from the output port E7 of switching valve 140 via the notch 205 at the piston 148 side (see FIG. 17(a)).

The pilot hydraulic fluid that has flowed out from the output port E7 of pattern switching valve 140 is supplied to the boom-up side pilot port 72b of boom control valve 72. As a result, the boom is actuated upward.

Furthermore, if the left pedal 16L is foot manipulated at the rear side, the pilot hydraulic fluid that has been output from the pilot passage 112 flows into the input port I11 of pattern switching valve 140.

As shown in FIGS. 17(a) and 17(b), the pilot hydraulic fluid that has been input into the input port I11 flows out from the output port E8 of switching valve 140 via the notch 207 at the piston 148 side (see FIG. 17(a)).

The pilot hydraulic fluid that has flowed out from the output port E8 of pattern switching valve 140 is supplied to the boom-down pilot port 72a of boom control valve 72. As a result, the boom is actuated downward.

Moreover, if the right pedal 16R is foot manipulated at the front side, the pilot hydraulic fluid that has been output from the pilot passage 113 flows into the input port I14 of pattern switching valve 140.

As shown in FIGS. 17(a) and 17(b), the pilot hydraulic fluid that has been input into the input port I14 flows out from the output port E11 of switching valve 140 via the passage 204a and notch 204 at the piston 148 side (see FIG. 17(b)).

The pilot hydraulic fluid that has flowed out from the output port E11 of pattern switching valve 140 is supplied to the bucket-dumping side pilot port 73a of bucket control valve 73. As a result, the bucket is actuated to the dumping side.

Furthermore, if the right pedal 16R is foot manipulated at the rear side, the pilot hydraulic fluid that has been output from the pilot passage 114 flows into the input port I13 of pattern switching valve 140.

As shown in FIGS. 17(a) and 17(b), the pilot hydraulic fluid that has been input into the input port I13 flows out from the output port E12 of switching valve 140 via the passage 203a and notch 203 at the piston 148 side (see FIG. 17(b)).

The pilot hydraulic fluid that has flowed out from the output port E12 of pattern switching valve 140 is supplied to the bucket-excavation side pilot port 73b of boom control valve 73. As a result, the bucket is actuated to the excavation side.

In case an attachment is installed, the following motion is executed.

Thus, if the left control lever 6L is manipulated in the rightward direction, the pilot hydraulic fluid that has been output from the pilot passage 13 flows into the input port I3 of pattern switching valve 40. Therefore, the pilot hydraulic fluid flows into the passage 63 at the body 47 side via the passage 67 at the body 47 side and the notch 62 at the piston 48 side. The pilot hydraulic fluid that has flowed into the passage 63 is output from the output port E5 and input into the input port I7 of switching valve 140 (see FIG. 15(c)).

As shown in FIGS. 17(a) and 17(b), the pilot hydraulic fluid that has been input to the input port I7 flows out from the output port E10 of switching valve 140 via the notch 201 at the piston 148 side (see FIG. 17(a)).

The pilot hydraulic fluid that has flowed out from the output port E10 of pattern switching valve 140 is supplied to the attachment-down side pilot port 172a of attachment control valve 172. As a result, the attachment is actuated downward.

If the left control lever 6L is manipulated in the leftward direction, the pilot hydraulic fluid that has been output from the pilot passage 14 flows into the input port I4 of pattern switching valve 40. Therefore, the pilot hydraulic fluid flows into the passage 66 at the body 47 side via the passage 68 at the body 47 side and the notch 65 at the piston 48 side. The pilot hydraulic fluid that has flowed into the passage 66 is output from the output port E6 and input into the input port I8 of switching valve 140 (see FIG. 15(c)).

As shown in FIGS. 17(a) and 17(b), the pilot hydraulic fluid that has been input to the input port I8 flows out from the output port E9 of switching valve 140 via the notch 202 at the piston 148 side (see FIG. 17(a)).

The pilot hydraulic fluid that has flowed out from the output port E9 of pattern switching valve 140 is supplied to the attachment-up side pilot port 172b of attachment control valve 172. As a result, the attachment is actuated upward.

As described above, with the pattern switching valves 40, 140 shown in FIGS. 9~17, switching between the first operation pattern S1, second operation pattern S2, and third operation pattern S3 can be conducted by a simple operation of changing the relative positions of pistons 48, 148 with respect to body 47.

In this case, since the switching valve 40 and switching valve 140 are provided in the same body 47, the passages connecting the switching valves 40, 140, that is, the passages connecting the output ports E5, E6 of switching valve 40 to the input ports 17, 18, respectively, of switching valve 140 can be formed in the body 147.

Furthermore, pistons 48, 148 can have any shape, and not necessarily a cylindrical shape, provided that they can change their relative positions with respect to body 47.

If pistons 48, 148 have a cylindrical shape, then the operation patterns can be switched by a more simple operation of rotary controlling the pistons 48, 148. Furthermore, the structure of pattern switching valves 40, 140 can be simplified.

Moreover, in the present embodiment, in case of the first and second operation patterns S1, S2, the attachment is actuated by foot manipulation of left pedal 16L, and in case of the third operation pattern, the attachment is actuated by manipulation of the left control lever 6L. However, in case of the first and second operation patterns S1, S2, the attachment may be actuated by foot manipulation of the right pedal 16R, and in the third operation pattern S3, the attachment may be actuated by manipulation of the right control lever 6R.

Figure 8:
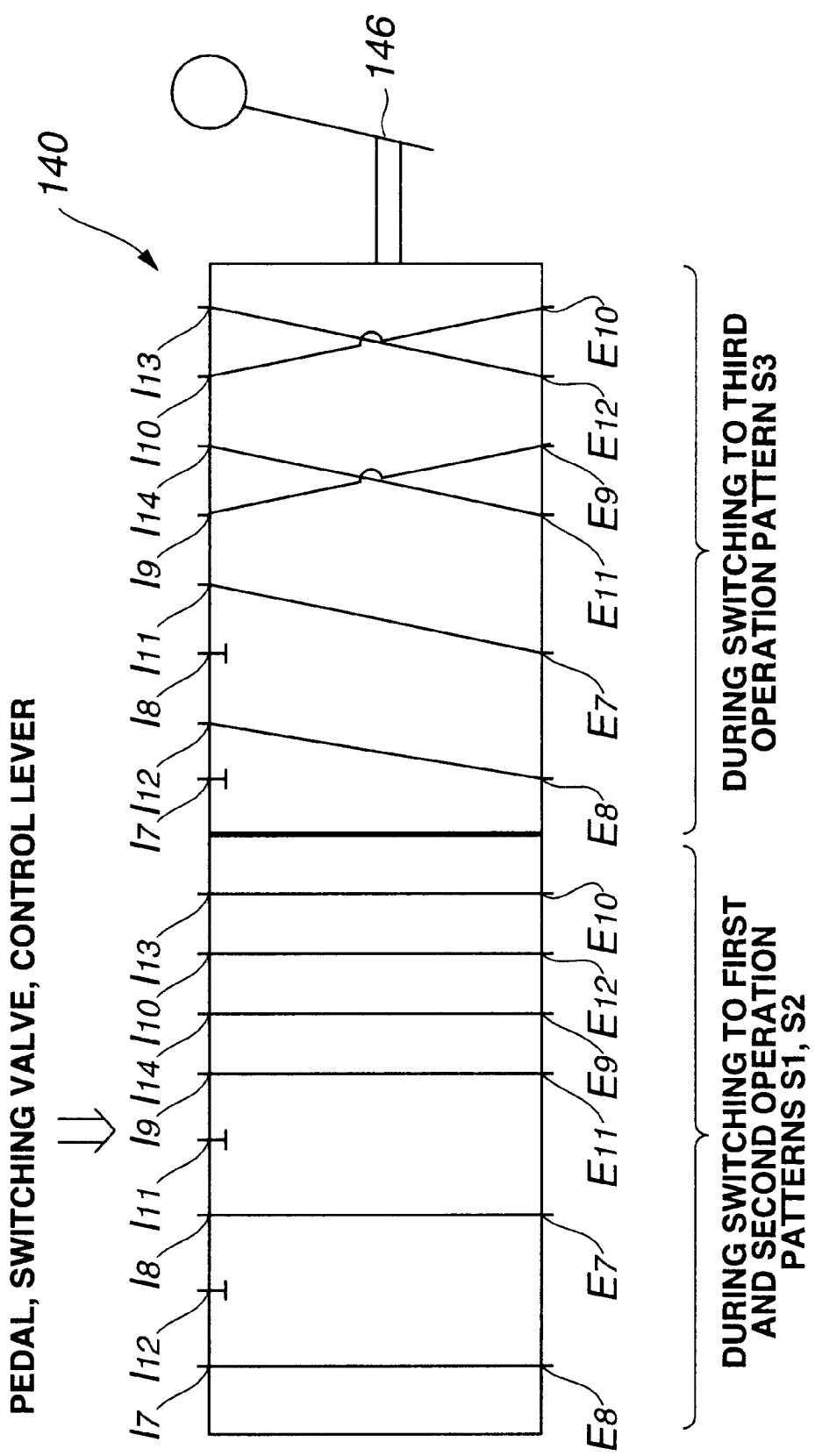
FIG. 8 illustrates an example of another configuration of the second pattern switching valve shown in FIG. 7.

In this case, the switching valve 140 may have a configuration shown in FIG. 8.

With the switching valve 140 shown in FIG. 8, if switching is conducted to a switching position of the first and second operation patterns S1, S2, the attachment is actuated upward by foot manipulation of the right pedal 16R at the front side and the attachment is actuated downward by foot manipulation of the right pedal 16R at the rear side. Furthermore, if switching is conducted to a switching position of the third operation patterns S3, the attachment is actuated upward by manipulation of right control lever 6R in the rightward direction and the attachment is actuated downward by manipulation of right control lever 6R in the leftward direction.

Furthermore, the present embodiment related to an example of combination of the manipulation directions of control levers 6L, 6R and pedals 16L, 16R and the actuation directions of traveling bodies, boom, bucket, and attachment, but any combinations other than the combinations considered as an example in the present embodiment can be appropriately selected.

Moreover, in the present embodiment, switching between three operation patterns was assumed. However, switching to four operation patterns can also be implemented by using all combinations of two switching positions of switching valve 40 and two switching positions of switching valve 140.

Further, in the present embodiment an assumption was made that there are the following three types of working machines: a boom, an arm, and an attachment. However, the present invention can be also used when the number of types of working machines is increased. In this case, switching to a larger number of operation patterns can be conducted by increasing the number of switching positions of switching valves 40, 140 to no less than three positions.

Moreover, switching to an even larger number of operation patterns can be conducted by adding similar switching valves in a similar connection fashion to switching valves 40, 140.

What is claimed is:

1. An apparatus for changing a combination of control devices and actuators, comprising:
two, left and right, first control devices for outputting a plurality of first manipulation direction signals according to a plurality of manipulation directions;
two, left and right, second control devices for outputting a plurality of second manipulation direction signals according to a plurality of manipulation directions;
actuators for left and right traveling bodies, which are provided for each of the left and right traveling bodies a vehicle for actuating the left and right traveling bodies in respective directions by driving in a driving direction corresponding to an input driving signal; and actuators for at least two working machines, which are provided for each of at least two working machines for actuating the at least two working machines in respective directions by driving in a driving direction corresponding to an input driving signal;

in which the combination of manipulation directions of the first and second control devices and driving directions of the actuators is changed, wherein a first switching valve for switching the combination of a plurality of input signals and a plurality of output signals and a second switching valve for switching the combination of a plurality of input signals and a plurality of output signals are provided, the first manipulation direction signals which are output from the first control devices and the second manipulation direction signals which are output from the second control devices are input as input signals to the first switching valve and the second switching valve, and a predetermined output signal of the output signals that are output from the first switching valve is input as an input signal to the second switching valve, and the output signals, excluding the predetermined output signal input to the second switching valve, among the output signals of the first switching valve and the output signals of the second switching valve are input as driving signals to the actuators for the traveling bodies and the actuators for working machines.

2. An apparatus for changing the combination of control devices and actuators according to claim 1, wherein, the first switching valve and the second switching valve are provided in a same body.

* * * * *